(12) United States Patent
Olsson et al.

(10) Patent No.: US 11,300,701 B1
(45) Date of Patent: Apr. 12, 2022

(54) UTILITY LOCATORS WITH RETRACTABLE SUPPORT STRUCTURES AND APPLICATIONS THEREOF

(71) Applicant: SeeScan, Inc., San Diego, CA (US)

(72) Inventors: Mark S. Olsson, La Jolla, CA (US); James F. Kleyn, Santee, CA (US)

(73) Assignee: SEESCAN, INC., San Diego, CA (US)

( * ) Notice: Subject to any disclaimer, the term of this patent is extended or adjusted under 35 U.S.C. 154(b) by 282 days.

(21) Appl. No.: 16/222,994

(22) Filed: Dec. 17, 2018

Related U.S. Application Data

(63) Continuation of application No. 15/457,897, filed on Mar. 13, 2017, now Pat. No. 10,162,074.

(60) Provisional application No. 62/307,365, filed on Mar. 11, 2016.

(51) Int. Cl.
| | |
|---|---|
| *G01V 3/10* | (2006.01) |
| *H01Q 1/12* | (2006.01) |
| *F16M 11/22* | (2006.01) |
| *G01V 3/08* | (2006.01) |
| *G01V 3/12* | (2006.01) |
| *H01Q 1/27* | (2006.01) |
| *H01Q 21/29* | (2006.01) |
| *H01Q 7/00* | (2006.01) |

(52) U.S. Cl.
CPC ............ *G01V 3/104* (2013.01); *F16M 11/22* (2013.01); *G01V 3/08* (2013.01); *G01V 3/12* (2013.01); *H01Q 1/1235* (2013.01); *H01Q 1/273* (2013.01); *G01V 3/108* (2013.01); *H01Q 7/00* (2013.01); *H01Q 21/29* (2013.01)

(58) Field of Classification Search
None
See application file for complete search history.

(56) References Cited

U.S. PATENT DOCUMENTS

| | | | |
|---|---|---|---|
| 5,754,049 A | 5/1998 | Howell | |
| 7,336,078 B1 * | 2/2008 | Merewether | G01V 3/15 324/326 |
| 7,443,154 B1 * | 10/2008 | Merewether | G01V 3/08 324/67 |
| 8,248,056 B1 * | 8/2012 | Olsson | G01R 29/0871 324/67 |
| 9,207,350 B2 | 12/2015 | Olsson et al. | |
| 2013/0127470 A1 * | 5/2013 | Olsson | G01V 3/00 324/326 |

OTHER PUBLICATIONS

International Searching Authority, "Written Opinion of the International Searching Authority" for PCT Patent Application No. PCT/US2017/022202, dated Sep. 14, 2017, European Patent Office, Munich.

* cited by examiner

*Primary Examiner* — Douglas X Rodriguez
(74) *Attorney, Agent, or Firm* — Steven C. Tietsworth, Esq.; Michael J. Pennington, Esq.

(57) ABSTRACT

The disclosure is directed to utility locators and associated antenna node support structure devices for allowing a utility locator to self-stand in an upright position without being held or otherwise supported by a user.

16 Claims, 14 Drawing Sheets

UTILITY LOCATORS WITH RETRACTABLE SUPPORT STRUCTURES AND APPLICATIONS THEREOF

CROSS-REFERENCE TO RELATED APPLICATIONS

This application is a continuation of and claims priority to co-pending U.S. Utility patent application Ser. No. 14/457, 897, entitled UTILITY LOCATORS WITH RETRACTABLE SUPPORT STRUCTURES AND APPLICATIONS THEREOF, filed Mar. 13, 2017, which claims priority under 35 U.S.C. § 119(e) to U.S. Provisional Patent Application Ser. No. 62/307,365, entitled UTILITY LOCATOR SUPPORT STRUCTURES, filed Mar. 11, 2016. The content of each of these applications is hereby incorporated by reference herein in its entirety for all purposes.

FIELD

This disclosure relates generally to electromagnetic utility locator devices, commonly known as "locators," for locating buried or otherwise obscured utility lines or conductors. More specifically, but not exclusively, the disclosure relates to utility locators and associated attachment devices for allowing a utility locator to self-stand in an upright position during use, without the need to be held or otherwise supported by a user.

BACKGROUND

Incidents caused by improperly or inaccurately located utility lines have resulted in loss of human life as well as costly damage to infrastructure. In a traditional utility line locating operation (also referred to herein simply as a "locate"), a user moves about an area with a utility locator in hand to try to find the position of one or more buried or hidden utilities (such as buried pipes, wires, or other conductors). These locating operations are important for maintaining infrastructure as well as protecting human life during excavation, drilling, or other construction operations.

As locators have increased in performance, the complexity of associated locating systems, devices, and methods has also increased. In many applications it may be desirable or even necessary for a locator to be used in a self-supported stationary and upright position, thereby allowing a user the freedom to work on other facets of a utility locating operation, such as collecting related data, controlling utility transmitter operation, interacting with a notebook computer, tablet device, smartphone, and the like.

In some applications, a user may need to continually transition between periods of positioning a locator in a stationary self-supported upright orientation and carrying the utility locator device while moving about the locate area. In other applications, such as in a traditional locate operation, a user may carry a utility locator while moving through all or most of the locate operation while positioning it just above the ground.

Most existing utility locator devices are human supported and require a user to perform the inconvenient task of holding the locator still and upright above the ground for lengthy periods of time while performing a locate operation. Other locators may self-stand through attachments and/or other mechanisms that are physically large and/or obtrusive to the user and which may hinder easy use of the locator. Moreover, existing support devices and mechanisms are typically unwieldly to carry separately from the locator. Furthermore, currently known support devices and mechanisms configured for detachability and non-obtrusiveness are typically limited in use to locators having physically small antenna nodes. Such support devices and mechanisms fail to function at all on some locators, or function obtrusively and/or difficultly on locators having large antenna nodes. Existing support devices are often unnecessarily bulky, adding to weight and overall unwieldiness of their associated locators.

Accordingly, there is a need in the art to address the above-described as well as other problems related to utility locators and locate operations.

SUMMARY

Embodiments of an antenna node support structure device in accordance with various aspects of the present disclosure address the aforementioned problems as well as others.

Such antenna node support structures may include multiple legs that may be removably detachable from a lower node support assembly secured to the locator and/or from a lower node itself. The lower node support assembly may secure to the lowest antenna node of a locator and may include legs that angle in a deployed state so as to contact the ground's surface and hold the locator in an upright orientation without being held or otherwise supported by a user. A locator for self-standing in an upright position using an antenna node support structure device may allow the locator's sensors, such as magnetic field antennas, to be positioned above the ground surface in a desired position, similarly to the position they are normally held in by a user doing a traditional locate operation. Self-standing locators may provide increased accuracy due to minimal movement and positioning in a well-defined reference orientation relative to the ground or other surface over which it is used.

In exemplary embodiments, the antenna node support structures disclosed herein are tripod type devices; however, they need not be so limited. For example, some antenna node support structure embodiments may have four or more legs as needed to adequately support a utility locator device, or, in some embodiments, fewer than three legs. Legs of various shapes and sizes may be used in various embodiments, including legs having circular or rectangular cross-sections, as well as flexible and/or retractable legs and associated joints.

Antenna node support structures disclosed herein may be optimized for use on a locator having a physically large lower antenna node, such as a dodecahedron antenna node as described in various patent and patent applications subsequently incorporated by reference herein. Such an antenna node may include an outer housing in a spherical shape and have a diameter of approximately 8 inches or larger, or have a diameter of approximately 10 inches or larger. In alternative embodiments, antenna node support structure devices in keeping with the present disclosure may be scaled, shaped, and/or otherwise adapted to other sized and shaped antennas, antenna nodes, and locator types. In some embodiments, the antenna node support structures may be constructed in a claw shape.

In one aspect, the legs of an antenna node support structure may be readily removable and/or re-attachable. Upon removing the legs, the locator may be carried and/or otherwise separated from the locator. Optionally, legs may be stowed unobtrusively within the antenna node support structure, which may itself be removably secured to the locator. Legs may be retained within the antenna node structure with a frictional coupling in either a stowed or deployed state. The frictional coupling may include legs and associated ports or sockets sized so as to have a frictional fit between each other to retain the legs in the ports. In some embodiments the legs may have common or symmetrical ends so that they can be inserted into the ports from either side. In alternative embodiments, latches, keying elements, hinges, and/or other retaining elements may be used to retain legs to the locator.

In another aspect, the legs, in a deployed state, stowed state, or fully removed state may be oriented so that they do not interfere with ease of use of the locator and/or the user's movement when carrying the locator. The legs and associated antenna node support structure may be minimally sized to allow unobtrusive locator functionality.

Typical antenna node support structure device embodiments as described herein may be fully or largely made of non-ferromagnetic materials so that the support structures don't interfere with magnetic field signals coming to or from the utility locator. For example, magnetic field signals from buried utility lines received at the various antenna nodes of the locator may be received at antennas of the locators with minimal interference and attenuation by using non-ferromagnetic materials for some or all of the antenna node support structures and/or legs. Such antenna node support structures may likewise use non-shielding materials, e.g., plastics or other materials allowing electromagnetic signals to pass through, so as to not attenuate or block other electromagnetic signals received or transmitted by a utility locator device, including, but not limited to, global position system (GPS) and/or other satellite navigation system signals received by modules in the locator, wireless communication signals to or from other locate system devices such as cellular data, WiFi, or Bluetooth signals, signals provided from optical sensors, and/or other signal(s) used in a utility locator system such as those described in the various incorporated patents and patent applications.

In another aspect, a locator may be retained in a fixed and still position during use of the locator so as to track sondes/beacons on other devices and systems used in locate operations. For example, one or more utility locators with legs in a deployed state may be placed on the ground and remain stationary in order to track and map other system devices such as pipe sondes as moved through a pipe, various excavation devices and systems, horizontal drilling devices as they bores holes through the earth, pipe jetter devices used to clear obstructions from pipes, and/or a variety of other similar devices and systems.

In one aspect, an embodiment may include an antenna node support device having a lower node support assembly that secures about and conforms to the lower antenna node, which may be an octahedral or dodecahedral antenna node. The lower node support assembly may include multiple (e.g., three or more) leg retainer subassemblies that secure about the mast on one end and the lower antenna node on the other. The leg retainer subassemblies may conform to the largely spherical shape of the lower antenna node. Each leg retainer subassembly may have a lower port or socket (also referred to as an angularly downward facing port) and an upper port or socket (also referred to as an angularly upward facing port) for securing the legs in a deployed or stowed state, respectively. The lower port may be shaped and positioned, when the antenna node support device is in a deployed state, to hold the legs in a downward angled orientation such that the legs contact the ground surface and hold the locator in an upright orientation without the need of being held or otherwise supported by a user. When the legs are removed from the lower port on each leg retainer subassembly, the legs may be reattached in an unobtrusive stowed state within the upper ports. A series of upper stow retainers may further aid in securing each leg in a stowed state.

Various additional aspects, features, devices, systems, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1A:
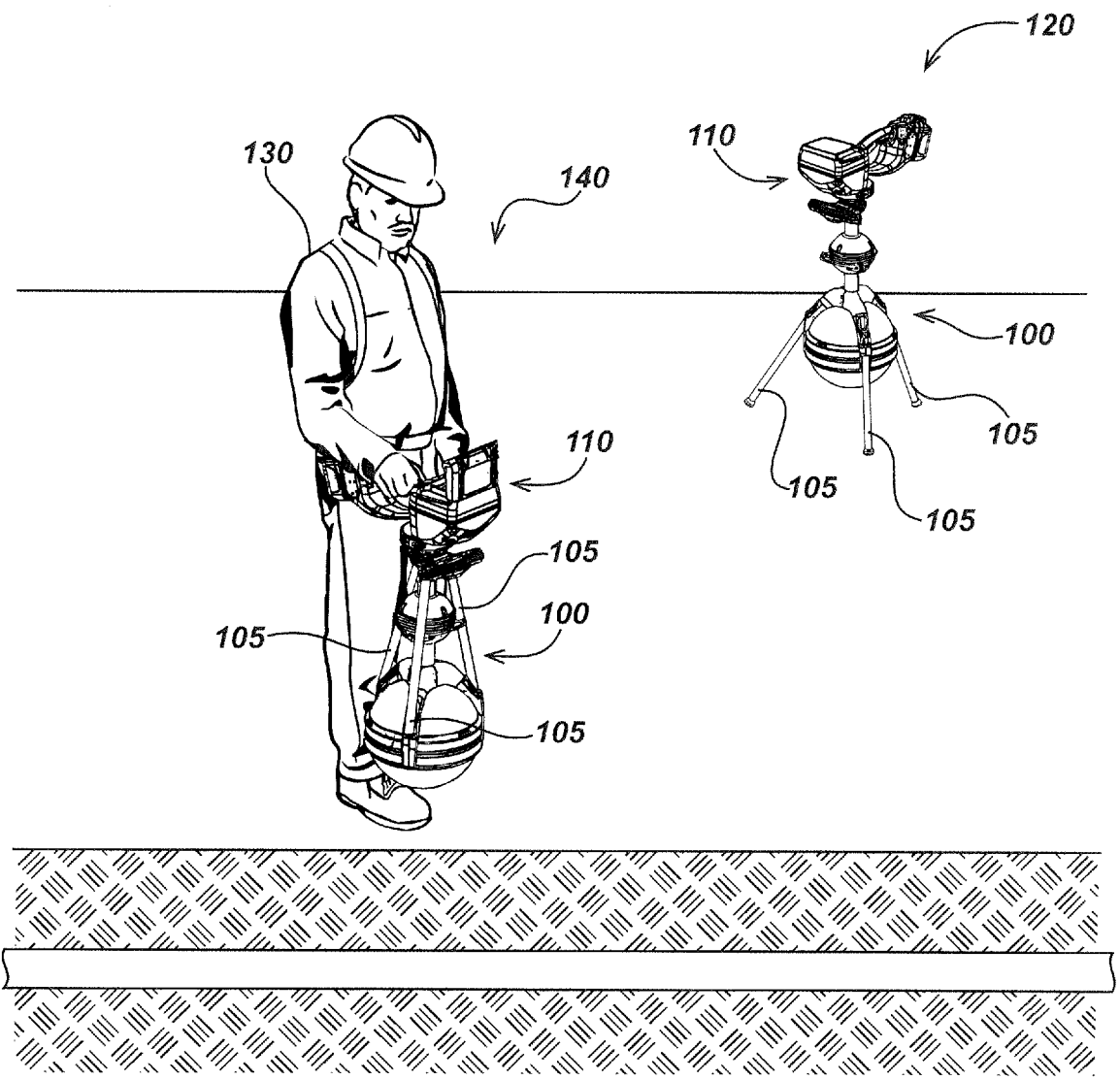
FIG. 1A is an illustration of locator embodiments and attached antenna node support device embodiments in deployed and stowed states.

This disclosure relates generally to utility locators and associated attachment devices that allow utility locators to self-stand in an upright position without being held or otherwise supported by a user.

As described herein, utility locators (interchangeably referred to as "utility locator devices," "buried object locators," "locator devices," "locating devices," "magnetic field sensing locating devices," or simply "locators") are electronic devices that determine information about buried or otherwise hidden or obscured utilities (e.g., conductive pipes or conduits, buried wires or other conductors, trace wires associated with buried pipes, and the like) by sensing magnetic fields emitted from the utilities.

Details of the utility locators referred to herein, additional components, methods, and configurations that may be used in conjunction with the embodiments described subsequently herein are disclosed in co-assigned patent applications including U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. patent application Ser. No. 12/939,591, filed Nov. 4, 2010, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCATOR SYSTEM EMPLOYING AUTOMATED VIRTUAL DEPTH EVENT DETECTION AND SIGNALING; U.S. patent application Ser. No. 13/605,960, filed Sep. 6, 2012, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 13/676,989, filed Nov. 14, 2012, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/769,202, filed Feb. 15, 2013, entitled SMART PAINT STICK DEVICES AND METHODS; U.S. patent application Ser. No. 13/774,351, filed Feb. 22, 2013, entitled DOCKABLE TRIPODAL CAMERA CONTROL UNIT; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. patent application Ser. No. 13/851,951, filed Mar. 27, 2013, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 13/958,492, filed Aug. 2, 2013, entitled OPTICAL ROUND TRACKING APPARATUS, SYSTEMS AND METHODS; U.S. patent application Ser. No. 14/022,067, filed Sep. 9, 2013, entitled USER INTERFACES FOR UTILITY LOCATORS; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. patent application Ser. No. 14/446,145, filed Jul. 29, 2014, entitled UTILITY LOCATING SYSTEMS WITH MOBILE BASE STATION; U.S. patent application Ser. No. 14/446,279, filed Jul. 29, 2014, entitled INDUCTIVE CLAMP DEVICES, SYSTEMS, AND METHODS; U.S. patent application Ser. No. 14/516,558, filed Oct. 16, 2014, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/752,834, filed Jun. 27, 2015, entitled GROUND TRACKING APPARATUS, SYSTEMS, AND METHODS; U.S. patent application Ser. No. 14/797,840, filed Jul. 13, 2015, entitled GROUND-TRACKING DEVICES AND METHODS FOR USE WITH A UTILITY LOCATOR; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. patent application Ser. No. 14/802,791, filed Jul. 17, 2015, entitled METHODS AND SYSTEMS FOR SEAMLESS TRANSI- TIONING IN INTERACTIVE MAPPING SYSTEMS; U.S. Pat. No. 9,085,007, issued Jul. 21, 2015, entitled MARKING PAINT APPLICATOR FOR PORTABLE LOCATOR; U.S. Provisional Patent Application 62/244,658, filed Oct. 21, 2015, entitled SIGNAL KEYING UTILITY LOCATING DEVICES, SYSTEMS, AND METHODS; U.S. patent application Ser. No. 14/949,868, filed Nov. 23, 2015, entitled BURIED OBJECT LOCATOR APPARATUS AND SYSTEMS; U.S. Provisional Patent Application 62/260,199, filed Nov. 25, 2015, entitled UTILITY LOCATING SYSTEMS, DEVICES, AND METHODS USING RADIO BROADCAST SIGNALS; U.S. patent application Ser. No. 15/006,119, filed Jan. 26, 2016, entitled SELF-STANDING MULTI-LEG ATTACHMENT DEVICES FOR USE WITH UTILITY LOCATORS; U.S. Provisional Patent Application 62/295,502, filed Feb. 16, 2016, entitled BURIED UTILITY MARKER DEVICES, SYSTEMS, AND METHODS; U.S. Provisional Patent Application 62/307,365, filed Mar. 11, 2016, entitled UTILITY LOCATOR SUPPORT STRUCTURES; U.S. Provisional Patent Application 62/327,412, filed Apr. 25, 2016, entitled SYSTEMS AND METHODS FOR LOCATING AND/OR MAPPING BURIED UTILITIES USING VEHICLE MOUNTED LOCATING DEVICES; U.S. Pat. No. 9,341,740, issued May 17,2016, entitled OPTICAL GROUND TRACKING APPARATUS, SYSTEMS, AND METHODS; U.S. Provisional Patent Application 62/350,147, filed Jun. 14, 2016, entitled TRACKABLE DIPOLE DEVICES, METHODS, AND SYSTEMS FOR USE WITH MARKING PAINT STICKS; U.S. Provisional Patent Application 62/352,731, filed Jun. 21, 2016, entitled SYSTEMS AND METHODS FOR UNIQUELY IDENTIFYING BURIED UTILITIES IN A MULTI-UTILITY ENVIRONMENT; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. patent application Ser. No. 15/250,666, filed Aug. 29, 2016, entitled PHASE-SYNCHRONIZED BURIED OBJECT TRANSMITTER AND LOCATOR METHODS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; and U.S. Pat. No. 9,465,129, issued Oct. 11, 2016, entitled IMAGE-BASED MAPPING LOCATING SYSTEM. The content of each of the above-described applications is hereby incorporated by reference herein in its entirety. The above applications may be collectively denoted herein as the "co-assigned applications" or "incorporated applications."

In various applications and methods of use in a buried utility locate operation (also known as a "locate"), it may be advantageous to, at times, position a utility locator in a stationary self-supported upright position to collect measurements and/or allow a user/operator to perform other functions. At other times, it may be desirable for a user to carry the locator about the locate area and move the locator in an oscillating circular sweeping motion or other motion while either in a stationary position or moving across the ground (i.e., as in a traditional locate operation). In yet other applications, a user may find it advantageous to continually transition between short periods of positioning a utility locator device in a stationary self-supported upright orientation on the ground and carrying the utility locator device about the locate area (e.g., setting the locator on the ground for a period of time in a stationary position, lifting the locator up and moving to a second location, setting on the ground in the second location, lifting it up and moving it again, etc.).

To accommodate these applications and methods of use, as well as others, antenna node support structure device embodiments may be implemented as described subsequently herein in accordance with various aspects, and/or in combination with other elements/apparatus of locator systems such as are as described in the incorporated applications, so as to be minimally intrusive to the user. The embodiments described herein may be used in various applications and methods, and, in exemplary embodiments, may be configured so as to be optimized for use on locators having a dodecahedron type antenna node or other physically large antenna node positioned at or near the bottom of a locator when held in an upright vertical orientation. Such an antenna node may, for example, be of the variety described in co-assigned patent applications such as U.S. patent application Ser. No. 13/469,024, filed May, 10, 2012, entitled BURIED OBJECT LOCATOR APPARATUS WITH SAFETY LIGHTING ARRAY; U.S. patent application Ser. No. 14/949,868, filed Nov. 23, 2015, entitled BURIED OBJECT LOCATOR APPARATUS AND SYSTEMS; and U.S. Provisional Patent Application 62/260,199, filed Nov. 25, 2015, entitled UTILITY LOCATING SYSTEMS, DEVICES, AND METHODS USING RADIO BROADCAST SIGNALS, the contents of which are incorporated by reference herein in their entirety.

In one aspect, an attachment device such as an antenna node support structure and attachment mechanisms for coupling the antenna node support structure to the locator are disclosed.

In exemplary embodiments, the antenna node support structures disclosed herein are tripod-type devices; however, they need not be so limited. For example, some antenna node support structure embodiments may have four or more legs as needed to adequately support a utility locator device, or, in some embodiments, fewer than three legs. Legs of various shapes and sizes may be used in various embodiments, including legs having circular or rectangular cross-sections, as well as flexible and/or retractable legs and associated joints.

Antenna node support structures disclosed herein may be optimized for use on a locator having a physically large lower antenna node, such as a dodecahedron antenna node as described in various patent and patent applications incorporated by reference herein. Such an antenna node may include an outer housing in a spherical shape and have a diameter of approximately 8 inches or larger, or have a diameter of approximately 10 inches or larger in some embodiments. The housings may have octahedral, dodecahedral, or other multiple-antenna element arrays contained within. In alternative embodiments, antenna node support structure devices in accordance with the present disclosure may be scaled, shaped, and/or otherwise adapted to other sized and shaped antennas, antenna nodes, and locator types.

In one aspect, the legs of an antenna node support structure may be adapted to be readily removable and re-attachable, such as through latches, clips, removable joints, friction joints, and/or other removable coupling mechanisms. Upon removing the legs, the locator may be carried and/or otherwise separated from the locator. Optionally, legs may be stowed within the antenna node support structure, which may itself be removably coupleable to the locator. Legs may be retained within the antenna node structure with a frictional coupling, and/or with other coupling mechanisms, in either a stowed or deployed state. The frictional coupling may include legs and associated ports or sockets sized so as to have a frictional fit between each other to retain the legs in the ports. In some embodiments the legs may have common or symmetrical ends so that they can be inserted into corresponding attachment ports from either end. In alternative embodiments, latches, keying elements, hinges, and/or other retaining elements may be used to retain legs to the locator.

In another aspect, the legs, in a deployed state, stowed state, or fully removed state may be oriented with respect to the locator so that they do not interfere with ease of use of the locator and/or the user's movement when carrying the locator. The legs and associated antenna node support structure may be minimally sized to allow unobtrusive locator operation.

Typical antenna node support structure device embodiments as described herein may be fully or largely made of non-ferromagnetic materials so that the support structures don't interfere with magnetic field signals coming to or from the utility locator, thereby allowing electromagnetic field signals to pass through to antennas with minimal attenuation. For example, magnetic field signals from buried utility lines received at the various antenna nodes of the locator may be received at antennas of the locators with minimal interference and attenuation by using non-ferromagnetic materials or other non-shielding materials for some or all of the antenna node support structures and/or legs. Such antenna node support structures may likewise use non-shielding materials so as to not attenuate or block other signals received or transmitted by a utility locator device, including, but not limited to, global position system (GPS) and/or other satellite navigation system signals received by modules in the locator, wireless communication signals to or from other locate system devices such as cellular data, WiFi, or Bluetooth signals, signals provided from optical sensors, and/or other electromagnetic signals used in a utility locator system such as those described in the various incorporated patents and patent applications.

In another aspect, a locator may be retained in a fixed and still position during use of the locator, typically in an upright or vertical orientation without user assistance, so as to track sondes/beacons on other devices and systems used in locate operations. For example, one or more utility locators with legs in a deployed state may be placed on and remain stationary with respect to the ground or other surface in order to track and map other system devices such as pipe sondes as they are moved through a pipe, various excavation devices and systems, horizontal drilling devices as they bores holes through the earth, pipe jetter devices used to clear obstructions from pipes, and/or other magnetic field generating devices.

In another aspect, an embodiment may include an antenna node support device having a lower node support assembly that secures about and is shaped to conform to a corresponding lower antenna node, which may be an octahedral or dodecahedral antenna node or other antenna node including eight or more antenna coils therein. The lower node support assembly may include multiple (e.g., three or more) leg retainer subassemblies that secure about the mast on one end and the lower antenna node on the other. The leg retainer subassemblies may conform largely to the spherical or other shape of a corresponding lower antenna node. Each leg retainer subassembly may have a lower port or socket and an upper port or socket for securing the legs in a deployed or stowed state, respectively. The lower port may be shaped and positioned, when the antenna node support device is in a deployed state, such as upright or vertical, to hold the legs in a downward angled orientation such that the legs contact the ground surface and hold the locator in an upright orientation without the need of being held or otherwise supported by a user. When the legs are removed from the lower port on each leg retainer subassembly, the legs may be reattached in an unobtrusive stowed state within the upper ports. A series of upper stow retainers may further aid in securing each leg in a stowed state.

Various additional aspects, features, and functions are described below in conjunction with FIGS. 1A through 6 of the appended drawing figures.

It is note that the following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments and configurations within the spirit and scope of the present disclosure.

Example Antenna Node Support Structure Device Embodiments for Use with Buried Utility Locators FIG. 1A illustrates details of an exemplary utility locator system including an antenna node support structure embodiment 100 coupled to a utility locator embodiment 110 lower node that is substantially spherically shaped. In an exemplary embodiment, the antenna node support structure 100 may be detachably coupled directly to a lower node of the locator; however, in alternate embodiments it may be detachably coupled to a locator mast or other structure.

In an exemplary embodiment, the lower node of the locator may be in a substantially spherical shape as shown in FIG. 1A and may include a housing enclosing an antenna array comprising multiple antenna coils, such as, for example, eight or more antenna coils, twelve antenna coils, or other numbers of antenna coils that form a magnetic field antenna array for sensing magnetic fields emitted from a buried utility from currents flowing therein.

The antenna node support structure embodiment 100 is shown in two different states in the two views of FIG. 1A; a deployed state and a retracted or stowed state. Locator 110 includes a housing in which elements are enclosed or coupled to, including receiver circuits and analog and digital electronics for processing magnetic field signals received at the antenna array, digital processing elements/modules, non-transitory memory for storing processed locate and other data, as well as user interface and control elements such as a visual display, audio input and/or output, control inputs via touchscreens, keypads or switches, as well as various other elements such as optional wired or wireless communication modules (e.g., cellular, WiFi, Bluetooth modules, camera modules, ground tracking modules, and the like). During operation a user typically interacts with user inputs and displays to perform locate operations. Examples of embodiments of such electronics as well as user interactions therewith are described in detail in the incorporated applications.

Antenna node support structure 100 may be secured to the utility locator 110 so as to allow deployment of a plurality of legs 105 therefrom. The legs 105 may be deployed to allow the locator 110 to self-support in an upright position for certain uses (denoted here as a "deployed state"). An example locator system in the deployed state is shown in the background to the right in FIG. 1A as locator system configuration 120, where the locator 110 is self-supported via the antenna node support structure embodiment's 100 deployed legs 105 so that no user support is needed. In another state, denoted here in as a "retracted," "stowed," or "stored" state (shown in configuration 140 with the legs pointing upward), the antenna node support structure's legs 105 (or equivalent features on alternate embodiments) are retracted as shown to the left of FIG. 1A (where a user is holding the locator system above the ground, such as is typically done while moving about a locate area).

The locator system 110 of FIGS. 1A-2C and as elsewhere described herein, may be any of the various utility locator devices as are known or developed in the art. For example, the locators may be locators such as those described in the incorporated applications and/or as is described in other utility locator patent applications or products (such as, for example, those provided by SeeScan, Inc., assignee of this application). In various embodiments disclosed herein, the locator may include a large lower antenna node (i.e., large relative to typical antenna nodes as used in assignee's SeekTech-branded products) having, for example, a diameter of approximately eight inches or larger. Examples of such large lower antenna nodes are those nodes disclosed in U.S. Pat. No. 9,207,350, issued Dec. 8, 2015, entitled BURIED OBJECT LOCATOR APPARATUS WITH SAFETY LIGHTING ARRAY; U.S. patent application Ser. No. 14/949,868, filed Nov. 23, 2015, entitled BURIED OBJECT LOCATOR APPARATUS AND SYSTEMS; and/or U.S. patent application Ser. No. 15/360,979, filed Nov. 23, 2016, entitled UTILITY LOCATING SYSTEMS, DEVICES, AND METHODS USING RADIO BROADCAST SIGNALS. The disclosures of each of these applications are incorporated by reference herein in their entirety.

As noted previously, in some locator applications it may be advantageous to stow legs or other support structure elements away for storage for all or part of a locate operation. For example, as shown in the front left in FIG. 1A in state 140, the system 100 may be carried by a user 130, with legs 105 of the support structure 100 folded upward and back toward the locator mast in an unobtrusive stowed state (relative to the bottom of the locator and the user's legs) as shown. When in this stowed state 140, the antenna node support structure 100 and its legs 105 may be positioned to be unobtrusive to the operation of the locator 110 such that the user 130 can use the locator 110 in a normal locate operating mode by moving it over the ground surface, without worrying about the legs hitting the ground, the user, and/or other objects or structures.

Figure 1B:
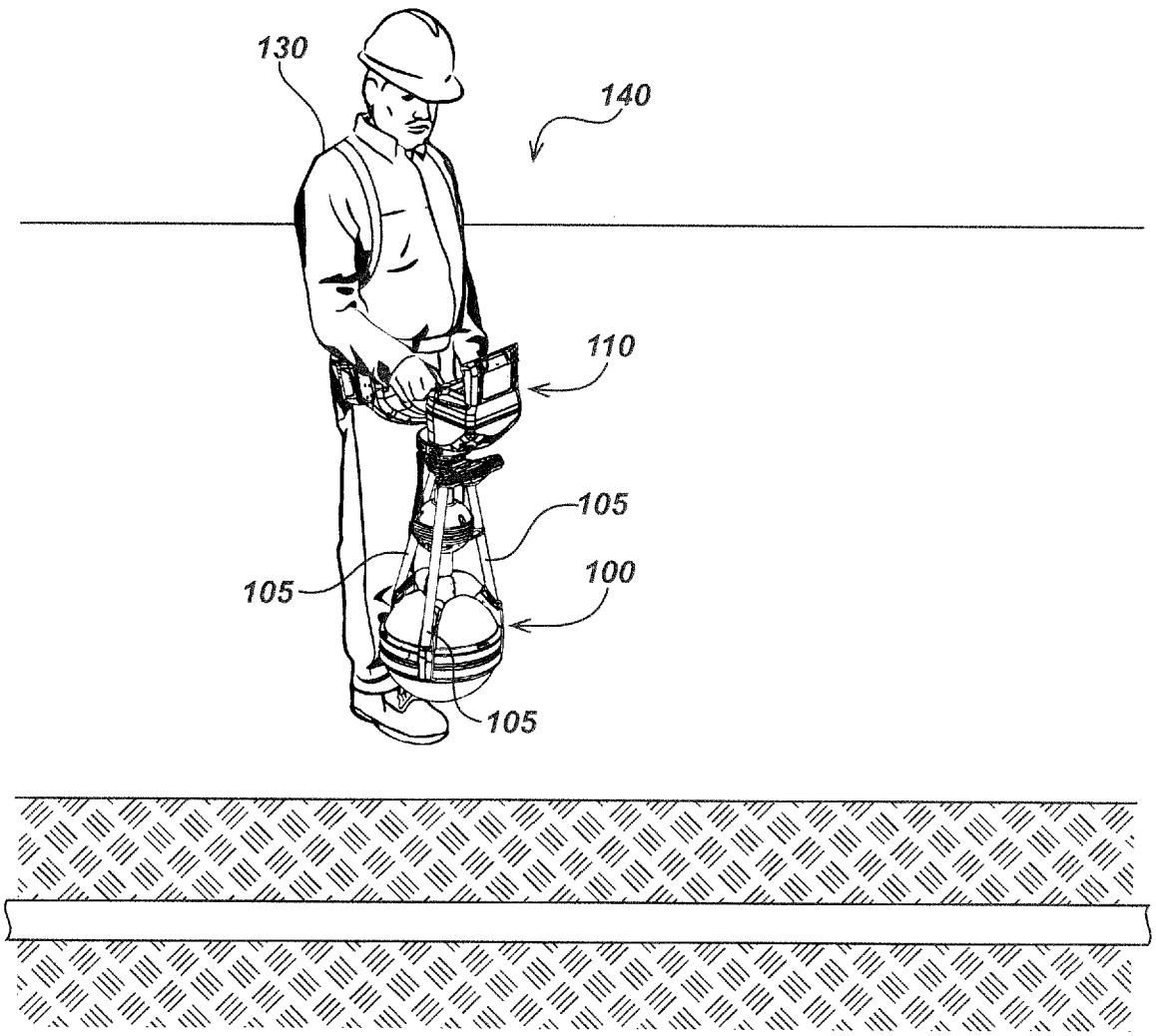
FIG. 1B is an illustration of a locator embodiment and an attached antenna node support device embodiment in a deployed state, carried by a user.

The stowed state 140 may be particularly advantageous in situations where there is no need for the locator to be placed down in a self-supporting manner for extended periods of time, such as when a user is moving about a locate sight with the locator in hand. FIG. 1B illustrates a user carrying the locator system while the antenna node support structure is in the retracted state 140.

Figure 1C:
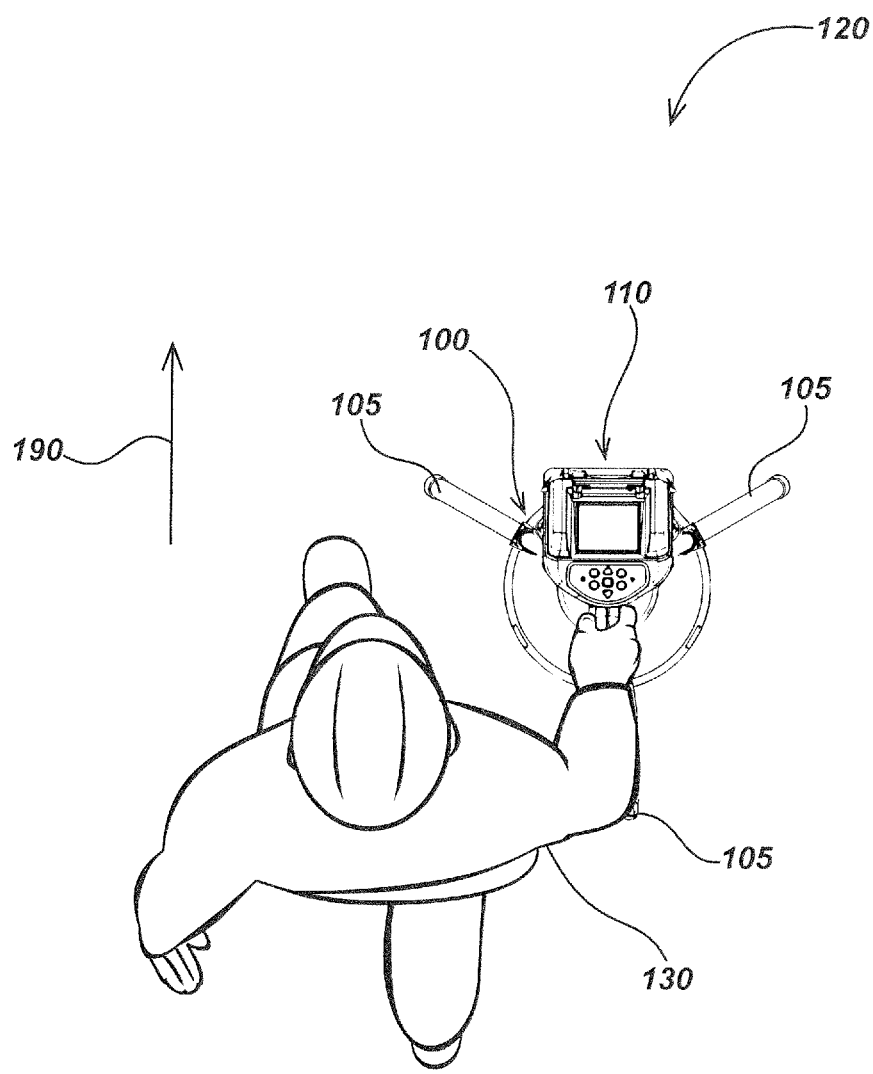
FIG. 1C is a top down illustration of a locator embodiment and an attached antenna node support device embodiment in a deployed state, carried by a user.

As shown in FIG. 1C, which illustrates user of a locator from a top down orientation, in some locate operations the locator system may be carried by user 130 in the deployed state 120. In state 120, the antenna node support structure 100 allows the user 130 to carry the locator as well as to place it on the ground. In this configuration, a user may transition between periods of positioning locator 110 in a self-supported upright orientation to carrying the utility locator 110 about the locate area, moving it over the ground as in a traditional locate operation, and then later placing it on the ground as shown to the right of FIG. 1A (e.g., when a user is "hopping" from one spot to another with the locator placed on the ground in a fixed position for some period of time to collect data and then rapidly moved by a user to the next position).

For example, antenna node support structure 100 may have three legs 105 positioned in the deployed state and oriented so that they don't interfere with a user's walking or other movements. The legs may be held to the support structure through a frictional connection such as through a frictional press fit to a port (e.g., a cylindrical or other shaped cavity) or other attachment structure or feature. In some embodiments, the legs may include painted stripes, reflective material, or other high visibility markings or elements to increase the visibility of legs when deployed.

In the exemplary embodiment shown, one of the three legs 105 is oriented in the user's normal walk and carry direction 190 and the other two legs 105 may be oriented facing forward in a symmetric, tripodal, right-left orientation. Although a three-legged tripodal support structure leg assembly is shown, other configurations may include two legs or more than three legs and/or alternate supporting elements to allow the antenna node of the locator to self-stand in a predefined orientation relative to the ground.

A deployed state, such as the locator 110 shown in deployed state 120 in FIG. 1A and FIGS. 2A-2C, may be useful in various utility mapping and excavating systems, as well as with line locating operations and systems. Such a locator system may, in various locating operations, be used to locate and determine orientation of sondes/beacons and/or other magnetic field signal generating devices. This may be done in single-dimensional space (e.g., Z-axis, where Z is normal to the Earth's surface), or in some systems in two or three dimensional space (X and Y, or X, Y, and Z space) and/or in real time. This sensing functionality of the locator may also be used to sense utility lines in addition to beacons (e.g., power transmission cables that generate their own magnetic field signals due to current flow therein), as well as other buried assets (e.g., conductors having induced currents flowing therein, such as from separate power cables, radio signals, and the like) that emit magnetic field signals.

For example, a locator system in a deployed state may be used to track movements from signals generated by one or more beacon devices while simultaneously receiving signals from buried utility lines and/or other sources. The various functions described subsequently herein need not be stationary and/or held upright by an antenna node support structure in a deployed state. The locators of such systems may implement the described functions while being moved about a locate environment and/or they may be positioned to remain stationary in other fixed orientations.

Figure 2A:
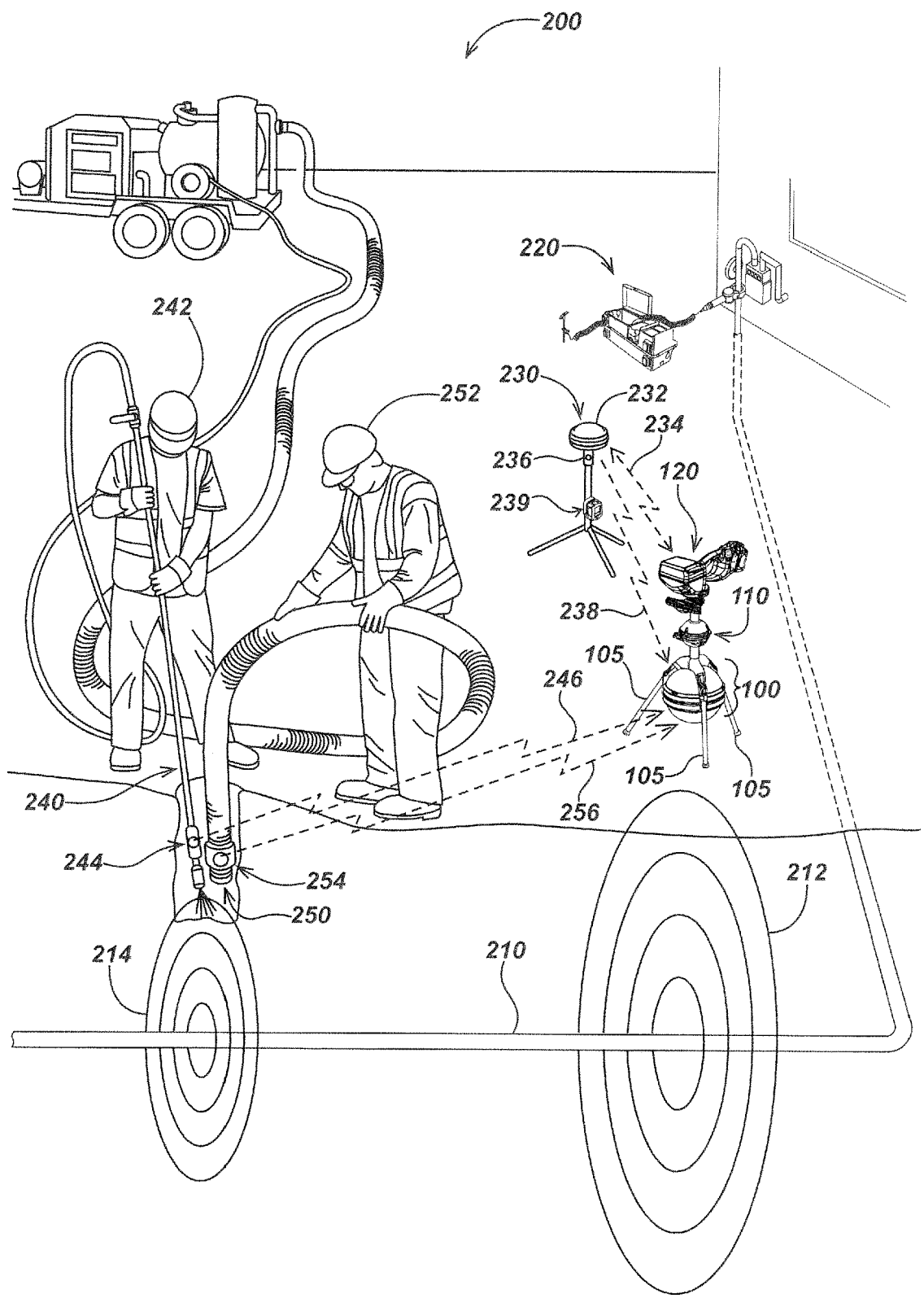
FIG. 2A is an illustration of a locator embodiment and an attached antenna node support device embodiment in a deployed state for tracking beacons in a utility locating and excavation system.
Figure 2B:
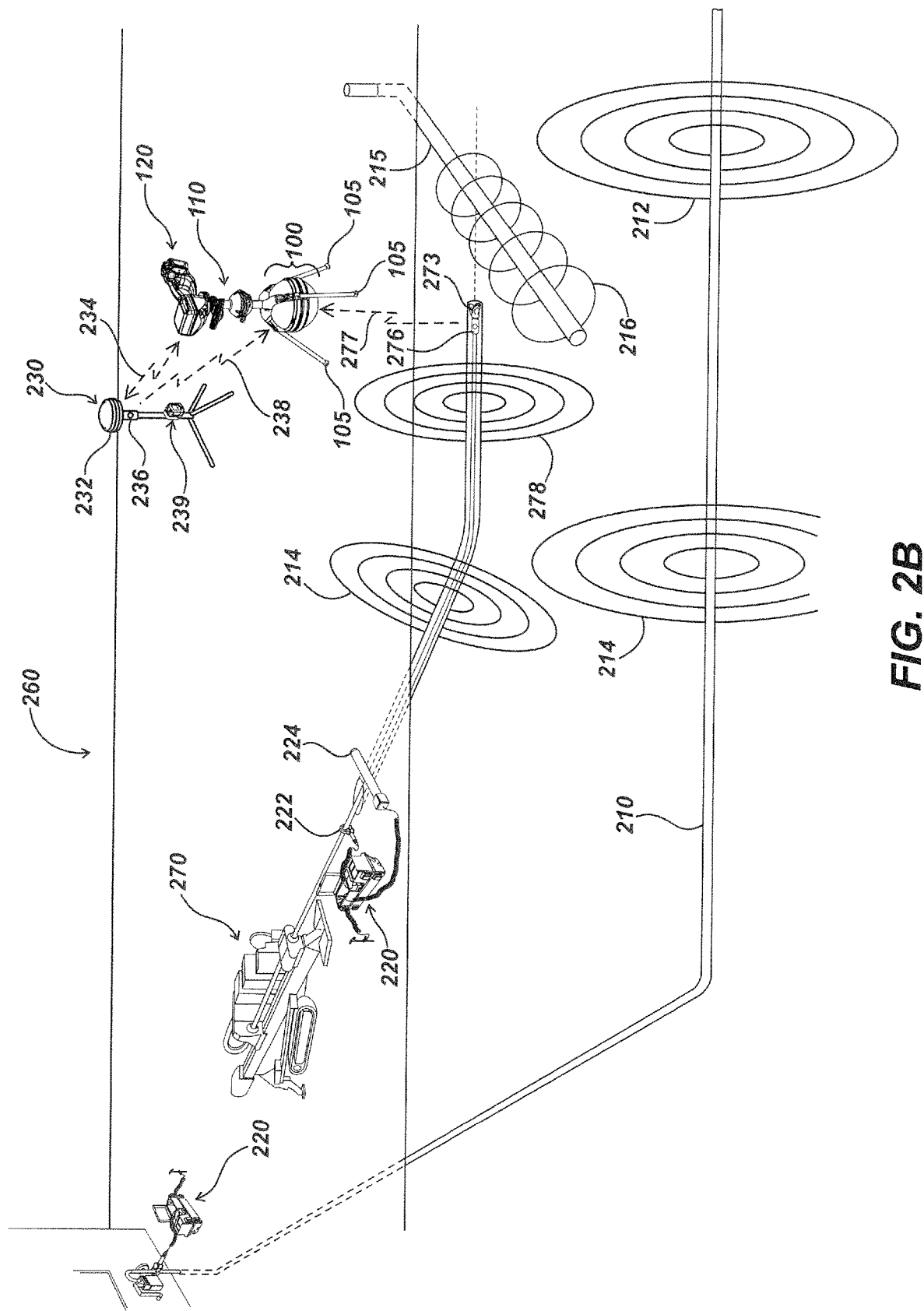
FIG. 2B is an illustration of a locator embodiment and an attached antenna node support device embodiment in a deployed state for tracking beacons in a utility locating and directional drilling system.
Figure 2C:
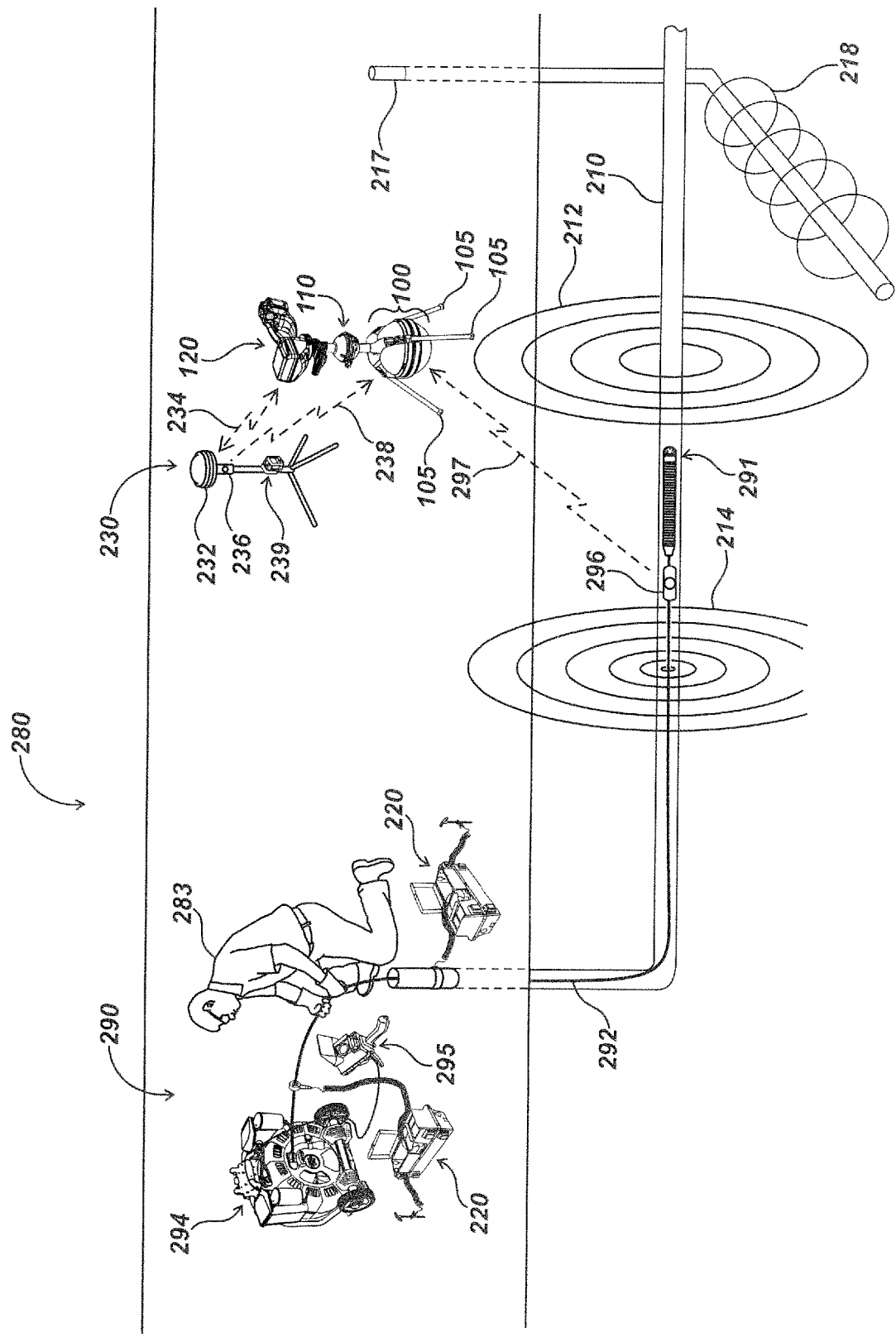
FIG. 2C is an illustration of a locator embodiment and an attached antenna node support device embodiment in a deployed state for tracking beacons in a utility locating and pipe inspection system.

The systems illustrated in FIGS. 2A-2C include such a locator 110 configured to remain stationary and held upright by antenna node support structure 100 in deployed state 120. The locator shown may be the same locator 110 and antenna node support structure 100 in a deployed state 120 as described in conjunction with and illustrated in FIG. 1A. The locator 110 may locate, track, and/or map various signals generated and emitted from various sources within the system environment in three dimensions and in real time while remaining in a fixed position. Some such signals may be emitted from a buried utility. For instance, the systems illustrated within FIGS. 2A-2C, may include a conductive utility line 210 onto which one or more signals, such as signal 212, may couple thereto and be emitted therefrom. In some system embodiments, the signal 212 may be an active signal impressed upon utility line 210 by a transmitter device 220 and/or other signal generating device. In other embodiments, the signals emitted from utility line 210 and/or other conductive elements within the locate environment may be from AM radio broadcast signals or other passive sources coupling thereto. In some embodiments, multiple transmitter devices 220 may be used to couple multiple signals onto various conductive elements of the system and/or environment.

The systems of FIGS. 2A-2C may further include a satellite navigation base station 230 for communicating position information to the locator 110 and/or other system devices. The satellite navigation base station 230 may include satellite navigation system receivers or sensors 232 (e.g., GPS, GLONASS, real time kinematics, or the like) and may also include gyroscopic, compass, and/or other position/orientation sensors, as well as electronic processing modules for managing communication with the various modules and controlling base station operation. The satellite navigation base station 230 may be configured to communicatively couple with locator 110 and send position data. The base station may include a GPS or other positioning system receiver as well as a wired or wireless communications link to the locator to communicate position and/or other data to and/or from the locator.

The position data may include real time kinematic (RTK) position data and/or tilt and orientation from gyroscopic and compass sensors. Such position information may be communicated through Bluetooth, WIFI, and/or other wireless communications receiver/transmitter modules via signal 234. In some embodiments not illustrated, a wired connection may be established between locator 110 and satellite navigation base station 230 and/or the sensors of both devices may be built into a single device.

The locator 110 may further include and/or may be configured to communicatively access historic map and/or position or location data (e.g. wirelessly accessed from cloud storage or other base station or computing device). Such data may include position and depth of known utility lines and/or other buried assets, as well as geographic information, roads or other infrastructure, terrain features, buildings and other structures, and the like. In such embodiments, the locator need not utilize signals emitted from the buried utility to determine their position and/or orientation in the ground, but rather may use the map/position data stored in a processor readable non-transitory memory of the locator.

Satellite navigation base station 230 may further include a beacon 236 for generating and transmitting signals such as signal 238, which may be received at locator 110. The relative position between the beacon and the locator may be determined in one or more axes (typically in three orthogonal axes) by detecting the beacon in the locator and processing the detected beacon signal to determine the relative position therebetween.

For example, beacon 236 may be a magnetic field dipole beacon for generating a magnetic dipole signal, with or without added data, also known in the art as a sonde. The locator 110 may receive signal 238 and determine or confirm its own position and/or relative position of the beacon based on the signal 238. In some embodiments, beacon 236 and/or other beacons may further modulate associated signals such as signal 238 to communicate position information and/or other information to locator 110 and/or other system devices via the magnetic field dipole signal.

The satellite navigation base station 230 may include a battery 239 to provide power to satellite navigation system sensors 232, signal generating components such as beacon 236 and wireless communication radios (e.g., Bluetooth, WIFI, and/or other radios for wireless communications), and/or other components of the satellite navigation base station 230. Additional beacon devices may further secure to one or more other system devices. In some beacon embodiments, an internal battery (not illustrated) may be used to provide power. The beacons described herein may generate and broadcast magnetic field signals at multiple frequencies (e.g., two different frequencies). In such embodiments, a lower frequency may be used for tracking and a higher frequency may be used to induce a signal 214 onto nearby conductive elements via inductive coupling (e.g., to utility lines, conductive elements of system tools, or the like).

The locator 110 may be programmed to locate, determine the orientation of, and track the beacons 236 in real time and in three dimensions as is known in the art and is described, for example, in the incorporated applications. The locator 110 may further be configured to display beacon locations while in use in both real time and in three dimensions. The locator 110 may further utilize the tracking of the various beacons to display presently tracked and historically mapped movements of beacons and associated device movements. In some embodiments, such information may, for instance, include and represent location, depth, and size of a hole being created during an excavation or drilling operation as well as the device's proximity to utility lines or other buried assets. In some embodiments, the real time locating and tracking beacons secured to system tools may guide the system tools in use and/or warn of proximity to utility lines or other buried assets. Historic map/position data may further be used to guide tools and/or warn of the proximity to known utility lines and/or other buried assets within the ground.

Turning to FIG. 2A, an excavating and locating system 200 may include the locator 110 with antenna node support structure 100 in a deployed state 120, and there may be a utility line 210, transmitter device 220, satellite navigation base station device 230, and associated components and signals thereof not specifically described in the above paragraphs. The excavating and locating system 200 may further include excavator devices to uncover a buried utility line 210 within the ground. For instance, a pressure gun device 240 and a vacuum device 250 may be used to uncover utility line 210. A user 242 may utilize pressure gun device 240 to break up the soil while another user 252 may utilize vacuum device 250 to remove the loosened soil.

One or more beacons may be secured to the excavator devices, which may be configured to transmit one or more magnetic field signals receivable at the locator. This allows movements of the beacons and associated attached devices to be located, tracked, the orientation thereof determined, and in addition be mapped in three dimensional space and/or in real time. For example, a beacon 244 may be attached to the pressure gun device 240 and a beacon 254 may be attached to vacuum device 250. The locator 110 may receive signals 246 and 256 transmitted from beacons 244 and 254, respectively, and then determine locations of each beacon 244 and 254 and their associated devices, pressure gun device 240, and vacuum device 250, in real time and/or in three dimensional space as the excavation process is carried out.

The locator 110 may further store and use tracking information of the various beacons (e.g., beacons 244 and 254) to display current tracked location and historically mapped movements of the beacons and associated tool movements. In some embodiments, such information may, for example, include and represent depth and size and specific shape of the hole being created during the excavation process as well as the pressure gun device 240 and vacuum device 250, proximity to utility line 210, or to other buried assets. The locator 110 may further be programmed to warn the user or users of the proximity to utility line 210 or other buried assets as well as guide the excavation process to avoid damage to utility line 210 and insure proper pot holing location.

The beacons 244 and 254 may transmit a lower frequency signal (e.g., signals 246 and 256) received at locator 110 and used to track each beacon 246 and 256, and thereby associated devices pressure gun device 240 and vacuum device 250. The beacons 244 and 254 may further transmit a higher frequency signal used to induce one or more signals onto a nearby conductive element. For instance, a signal 214, which may consist of a plurality of frequencies, may be emitted from utility line 210 generated from the coupling of the higher frequency signal or signals from beacons 244 and 254. The signal 214 may be received at the locator 110 and may be used to determine the position of the utility line 210 or other conductive elements onto which signal 214 is coupled. Further improvement of position of utility line 210 and the relative positions of beacon 244 and beacon 254 may be determined by measuring how the strength of the induced signal 214 varies with the movement of beacons 244 and 254.

Turning to FIG. 2B, a directional drilling and locating system 260 may include the locator 110 with antenna node support structure 100 in a deployed state 120, utility line 210, multiple transmitter devices 220, satellite navigation base station device 230, and associated components and signals thereof as described above. As shown in FIG. 2B, an additional interfering utility line 215 may be present below the ground where it interferes with the drilling operation of the directional drilling and locating system 260. The directional drilling and locating system 260 may further include a directional drilling device 270 having a drill string 272 onto the end of which a drill head 273 may be secured and configured to bore a hole through the ground. A beacon 276 may further be included along drill string 272 for generating and broadcasting a signal 277 further received at locator 110. The additional transmitter device 220 may secure to the directional drilling device 270 generating and coupling a signal to drill string 272 and/or drill head 273 as it moves through the ground.

For example, the transmitter device 220 may have an inductive clamp 222 and/or an induction stick device 224 for inducing a current signal onto drill string 272 and/or drill head 273. Additional details of such transmitter devices, inductive clamps, and induction stick devices such as the transmitter device 220, inductive clamp 222, and induction stick device 224 are described in U.S. patent application Ser. No. 14/446,279, filed Jul. 29, 2014, entitled INDUCTIVE CLAMP DEVICES, SYSTEMS, AND METHODS; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. patent application Ser. No. 14/800,490, filed Jul. 15, 2014, entitled UTILITY LOCATOR DEVICES, SYSTEMS, AND METHODS WITH SATELLITE AND MAGNETIC FIELD SONDE ANTENNA SYSTEMS; as well as in the various incorporated patents and patent applications. The inductive clamp 222 and/or induction stick device 224, which may be optionally operated at a low frequency, may induce a current signal onto drill string 272. A signal 278 may correspondingly be emitted from drill string 272 and/or drill head 273 and then received at locator 110. Signal 277 from beacon 276 and signal 278 from drill string 272 and/or drill head 276 may be used to determine the position of, track, and/or map beacon 276 and/or drill string 272 and/or drill head 273 in real time and three dimensions as it moves through the ground.

The beacon 276 may transmit a lower frequency signal (e.g., signal 277) that is received at locator 110 and used to track beacon 276 and thereby associated drill string 272 and/or drill head 273. The beacon 276 may further transmit a higher frequency signal used to induce one or more signals onto one or more nearby conductive elements. The higher frequency may be an integer multiple of the lower frequency. For instance, the higher frequency may be eight times or higher in frequency than the lower frequency.

A signal 214 may be emitted from utility line 210 and drill string 272 generated from the coupling of the higher frequency signal or signals from beacon 276. The signal 214 may be received at the locator 110 and be used to determine the position of the utility line 210 drill string 272. In some embodiments, the induced signal 278 on drill string 272 and/or drill head 273 may be used to locate, track, and/or map the drill string 272 and/or drill head 273 within the ground without the need of a beacon such as beacon 276. For example, the induced signal 278 may be cylindrical in field shape along the length of drill string 272. The field along the drill string 272 may change shape as it terminates at drill head 273. Locator 110 may be configured to identify the change in field shape and determine the position of the drill head 273 and its oriented direction within the ground.

The various signals of FIG. 2B used to track position of utility lines such as utility line 210 (e.g., signals 212 and 214) and tool positions (e.g., signals 214, 277, and 278) may be received at the locator 110 and used to guide the drilling operation of directional drilling and locating system 260. In some embodiments, the locator 110 may further be programmed to alert users of proximity to utility lines and/or other buried assets thus avoiding dangerous and/or costly damage to buried infrastructure, such as through audible or visible signaling to a user. For example, an interfering utility line 215 may lie across the path of the approaching drill head 273. The interfering utility line 215 may emit a signal 216 further received at locator 110 with antenna node support structure 100 in deployed state 120. Signal 216 may be generated from one or more passive and/or active signal sources. In some embodiments, the interfering utility line 215 may be a sewer line and the signal 216 may be from a pipe Sonde device (not illustrated) inserted within utility line 215. In other embodiments, the higher frequency of beacon 276 may induce a signal 216 in utility line 215 which may be detected at the locator 110, and the position and orientation of utility line 215 may be determined. In yet further embodiments, interfering utility line 215 need not emit any signal, and historic map/position data of the position and orientation of the interfering utility line 215 may be stored in a non-transitory memory of locator 110 and/or may otherwise be stored on a server or remotely and then accessed by the locator 110. The locator 110 may be programmed to guide tools such as that of the directional drilling device 270 as they bore through the ground and/or alert users of proximity to utility lines and/or other buried assets based on such historic map/position data and/or modified or controlled based on sensed magnetic field signals.

Turning to FIG. 2C, a pipe inspection and locating system embodiment 280 may include the locator 110 with the antenna node support structure 100 in a deployed state 120, utility line 210, transmitter device 220, satellite navigation base station device 230, and associated components and signals thereof as described above. Within FIG. 2C, an additional utility line 217 may be present with a signal 218 being emitted therefrom. The utility line 210 may be a pipe or other conductive conduit. The pipe inspection and locating system 280 may include a pipe inspection system 290 having an inspection camera 291 on the end of a push-cable 292. The inspection camera 291 and push-cable 292 may be dispensed into utility line 210 by a user 283 from a drum 294.

The pipe inspection system 290 may include a camera control unit (CCU) 295 displaying imagery collected from the camera, and the CCU may further control operation of the inspection camera 291. A beacon 296 may secure to the push-cable 292 for generating and broadcasting a signal 297 further received at locator 110. The locator 110 may determine location of beacon 296 and associated push-cable 292 and/or inspection camera 291 as well as positional data associated with the imagery therefrom as they are moved though the utility line 210. The beacon 296 may transmit a lower frequency signal (e.g., signal 297) received at locator 110 and used to track beacon 296 and thereby associated inspection camera 291 and imagery therefrom in real time and/or in three dimensions as it moves through the utility line 210. The beacons 296 may further transmit a higher frequency signal used to induce one or more signals onto one or more nearby conductive elements. For instance, a signal 214 emitted from utility line 210 and/or push-cable 292 may be generated from the coupling of the higher frequency signal or signals from beacon 296 thereto.

The higher frequency of beacon 296 may also induce a current signal 218 onto utility 217 (prior to which the utility's 217 presence may have been unknown). The locator 110 may receive radiated signals 214 and 218 and measure each separately. The presence as well as position and orientation of each utility line 210 and 217 may be determined from signals 214 and 218, respectively, at locator 110. The signal 214 received at the locator 110 may also be used to determine the position and/or orientation of push-cable 292 from signal 214 coupled thereto.

A transmitter device 220 may couple a signal to the utility line 210, thereby generating a signal 212 emitted therefrom. An additional transmitter device 220 may secure to the push-cable 292, generating and coupling a signal 298 to the push-cable 292 as it moves within utility line 210. The signal 298 may be emitted from push-cable 292 and may be received at locator 110 and may further be used to determine the position of the push-cable 292 and associated inspection camera 291 and imagery therefrom in real time and/or in three dimensions as it moves through the utility line 210.

Figure 3A:
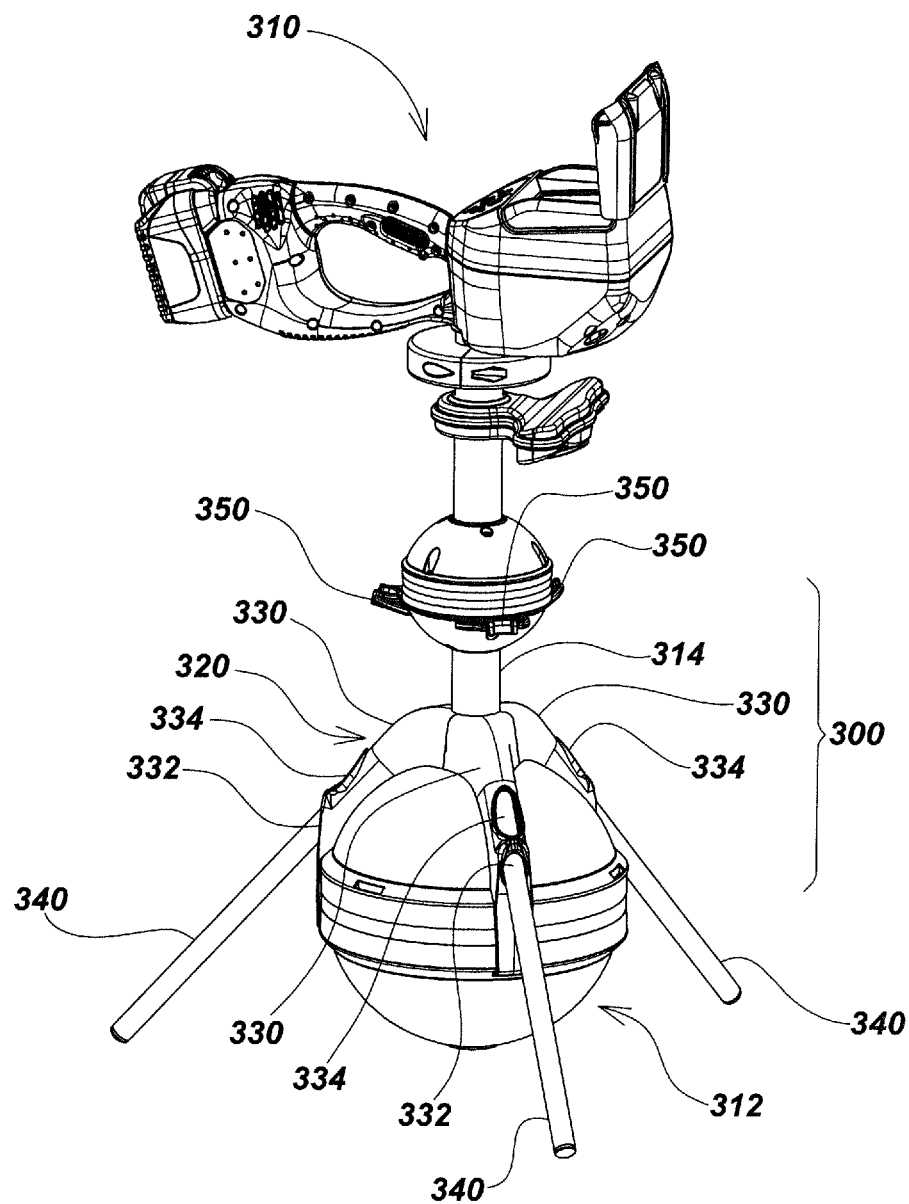
FIG. 3A is an isometric view of an antenna node support device embodiment in a deployed state.

Turning to FIG. 3A, details of the antenna node support structure embodiment 300 with attached locator embodiment 310 are illustrated. This embodiment may correspond to the antenna node support structure embodiment 100 and locator embodiment 110 shown in FIGS. 1A-2C. In an exemplary embodiment, the locator 310 has physically a large lower antenna node 312 (relative to traditional locator antenna nodes, such as those on Applicant's SeekTech-branded commercial locator products having node sizes of approximately 3.5 to 4 inches in diameter). For example, in one embodiment a locator such as locator 110 or 310 may have a spherical node with a diameter of approximately 8 inches or more. In some embodiments the large antenna node may have a diameter of approximately 10 inches or greater. Traditional locators are designed to minimize the size of the antenna node, whereas, in various embodiments as disclosed herein, larger antenna nodes may be used in conjunction with the disclosed antenna node support structure embodiments to provide additional functionality and advantages over traditional locator designs by performing gradient tensor signal processing techniques and/or other multiple antenna element signal processing techniques as described in, for example, the incorporated applications.

The antenna node may, for example, include a housing that encloses a multi-dimensional antenna array for sensing magnetic fields in three dimensions. For example, the antenna node may include an omnidirectional antenna array having three substantially orthogonally nested antenna coils, such as is described in the incorporated applications. In some embodiments the antenna array may include eight or more antenna coils. In one exemplary embodiment the antenna array includes 12 antenna coils in a dodecahedron configuration for gradient signal processing using twelve antenna coils. Other arrays may include various antenna configurations, such as arrays of three or more coils in various shapes and orientations.

In an exemplary embodiment as noted above, the antenna coils may be in an array housed in a node that is positioned at or near the bottom or distal end of mast 314 of locator 310. As noted above, the antenna array may be a dodecahedral antenna array as described in, for example, various co-assigned patent applications including: U.S. Pat. No. 9,207,350, issued Dec. 8, 2015, entitled BURIED OBJECT LOCATOR APPARATUS WITH SAFETY LIGHTING ARRAY; U.S. patent application Ser. No. 14/949,868, filed Nov. 23, 2015, entitled BURIED OBJECT LOCATOR APPARATUS AND SYSTEMS; and U.S. patent application Ser. No. 15/360,979, filed Nov. 23, 2016, entitled UTILITY LOCATING SYSTEMS, DEVICES, AND METHODS USING RADIO BROADCAST SIGNALS. Other antenna array types and configurations may alternately be used in other embodiments.

The antenna node support structure 300 may include a lower node support assembly 320 that secures about and conforms to the shape of lower antenna node 312. The support assembly may be shaped with a curvature corresponding to a spherical antenna node housing (when a spherical housing for the antenna array is used). However, in other embodiments having different shapes, corresponding alternate curvatures and/or angles may be used.

The lower node support assembly 320 may include multiple (e.g., three or more) leg retainer subassemblies 330 that secure about the mast 314 of locator 310 on one end and the lower antenna node 312 on the other. The leg retainer subassemblies 330 may conform largely to the spherical shape of the lower antenna node 312, with each spaced apart from the other leg retainer subassemblies 330. Each leg retainer subassembly 330 may have a lower port 332 for securing legs 340 in a deployed state (as illustrated in FIG. 3A) and an upper port 334 for securing the legs 340 in a stowed state (as illustrated in FIG. 3C). The upper port 334 may operate in conjunction with a series of upper stow retainer elements 350 to secure legs in a stowed state (as illustrated in FIG. 3C). The lower port 332 may be configured, when the antenna node support device 300 is in a deployed state, to hold the legs in a downward angled orientation such that the legs may contact the grounds surface and hold the locator 310 in an upright orientation without the need of being held or otherwise supported by a user.

Figure 3B:
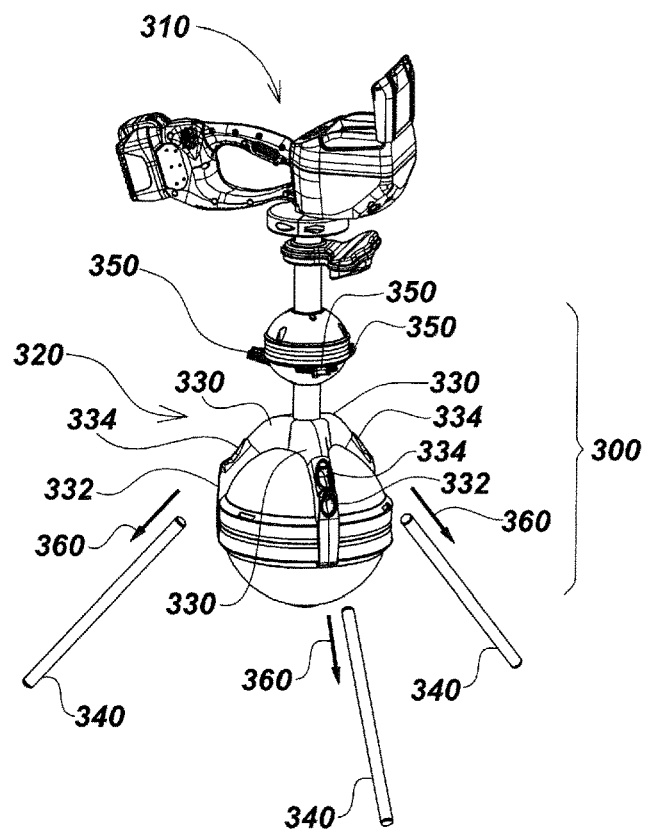
FIG. 3B is an isometric view demonstrating removal of legs from the antenna node support device embodiment of FIG. 3A.
Figure 3C:
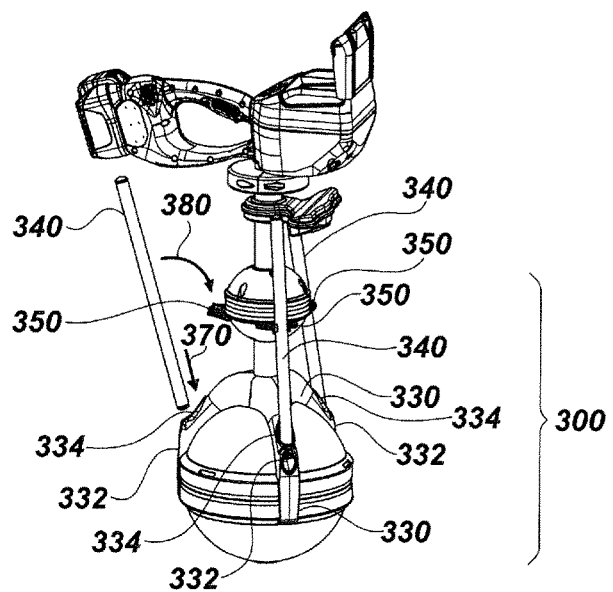
FIG. 3C is an isometric view of the antenna node support device embodiment of FIG. 3A with legs arranged in a stowed state.

Turning to FIG. 3B, the legs of the support assembly may be removably attachable so that a user can readily install or remove legs in the field. For example, legs 340 may be friction-fit, so they are removable from the lower port 332 of each leg retainer subassembly 330 by pulling on legs 340 along direction 360 or pushing the legs into the port for reconnection. In some locate operations, legs 340 may be set aside and locator 310 may be carried by a user without the legs installed. Installation of legs 340 in a deployed state may be done by forcing legs 340 in a contrary direction to direction 360 into the lower port 332 of each leg retainer subassembly 330. Attachment and removal may be done through pressure fitting, graduated diameter openings where the legs are inserted, locking mechanisms, or other mechanical attachment mechanisms as known or developed in the art.

As illustrated in FIG. 3C, in other locate operations the legs 340 may be reattached and positioned in the stowed state so that they are unobtrusive. For example, once legs 340 are removed from their respective lower ports 332 on each leg retainer subassembly 330, they may be reattached to the antenna node support structure 300 by pushing one end of one leg 340 into the upper port 334 on each leg retainer subassembly 330 in direction 370. Each leg 340 may then be pushed in direction 380 into a corresponding upper stow retainer element 350. Removal of legs 340 from an antenna node support structure 300 in a stowed state may be done by releasing legs 340 from the upper stow retainer elements 350 by pulling on legs in a contrary direction to direction 380, and then pulling the legs 340 free from their respective upper ports 334 in a direction contrary to direction 370.

Figure 3D:
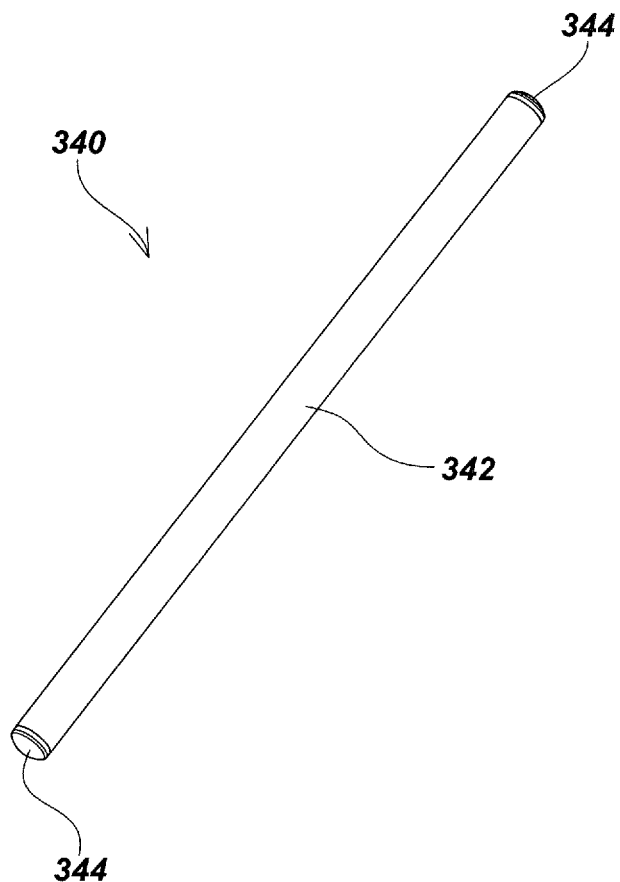
FIG. 3D is an isometric view of the legs of the antenna support device embodiment of FIG. 3A.

To maintain simplicity of design and use, the legs may be configured to be coupleable to the antenna node support structure from either end. For example, as illustrated in FIG. 3D, each leg 340 may be symmetric on the ends so that either end of the leg 340 may be installed within lower ports 332 or upper ports 334. Legs 340 may have a cylindrical body 342, and the body may be made of fiberglass or carbon fiber tubing or other electrically non-conductive light weight composite materials or, in some embodiments, lightweight metals or other lightweight materials.

Each leg 340 may include anti-skid feet 344 on each end of the body 342. Feet 344 may, for example, comprise Estane® thermoplastic polyurethane available from Lubrizol Corporation or other similar materials that provide friction and aid in preventing slippage of the antenna node support structure when in a deployed state. In other embodiments, legs and/or feet thereof may be shaped in various different ways including legs that are not end for end symmetric and/or that have separate grip feet or other grip mechanisms to secure them to the ground or other surface on which the locator is used.

In an exemplary embodiment, the antenna node is positioned at or near the distal end of a locator. As illustrated further in FIG. 4A, the lower node support assembly 320 may seat about the mast, such as mast 314 (shown partially herein with a dotted outline) on top of the lower antenna node 312 (also shown herein with dotted outline) of the locator. The lower node support assembly 320 may have three leg retainer subassemblies 330 shaped to conform to and circumscribe the mast 314 and extend vertically along three sides of the contour of the lower antenna node 312. In alternate embodiments having different numbers or configurations of legs, the antenna node support structure may have different numbers of leg retainer subassemblies extending vertically along various spaced apart sections of the lower antenna node 312. The legs may be bendable or foldable, such as through a hinge, latch, or other bending/folding mechanism, to allow transition from the stored or stowed state and the deployed state.

A collar assembly 440 may circumscribe and secure about mast 314 and may be seated on top of lower antenna node 312. The collar assembly 440 may include multiple collar elements 450 (also referred to as collar segments 460) that seat snugly about mast 314 and, when assembled with the other collar elements 450 further secured together via collar retainer elements 460, circumscribe mast 314. The collar retainer elements 460 may be formed with a series of hole features 462 dimensioned to snap or otherwise fit snugly onto post features 452. One of each collar retainer element 450 may seat on post features 452 formed along the outer edges of one collar element 450 and post features 452 formed along the contiguous outer edge of a neighboring collar element 450 such that neighboring collar elements 450 may be secured together via collar retainer elements 460. Collar assembly 440 may further include one or more securing elements such as a tie wrap fastener 470 that may cinch about the collar elements 450 and aid in tightly holding the collar assembly 440 together.

Figure 4A:
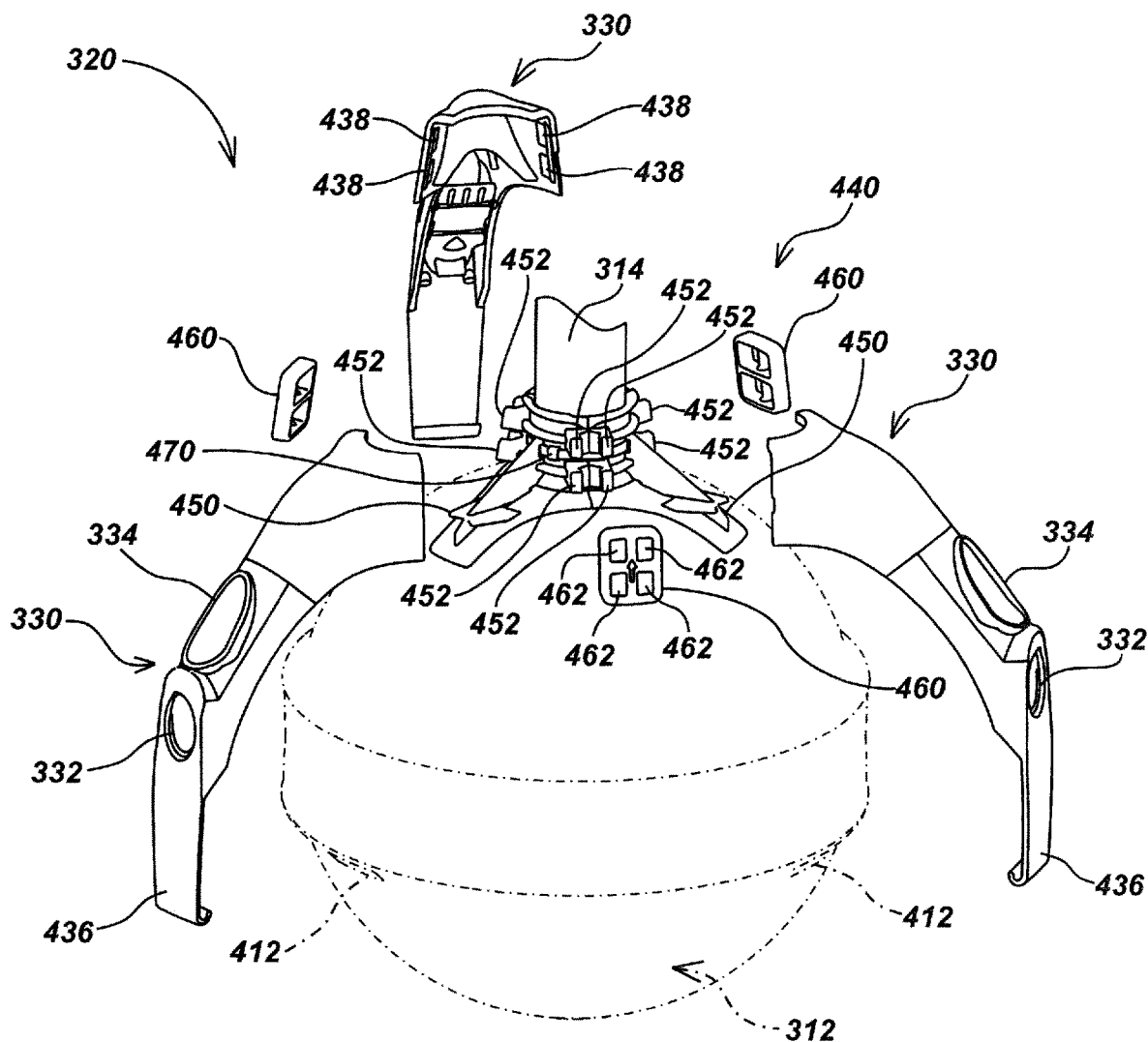
FIG. 4A is a detailed partially exploded view of a lower node support assembly embodiment of the antenna node support device embodiment of FIG. 3A.
Figure 4B:
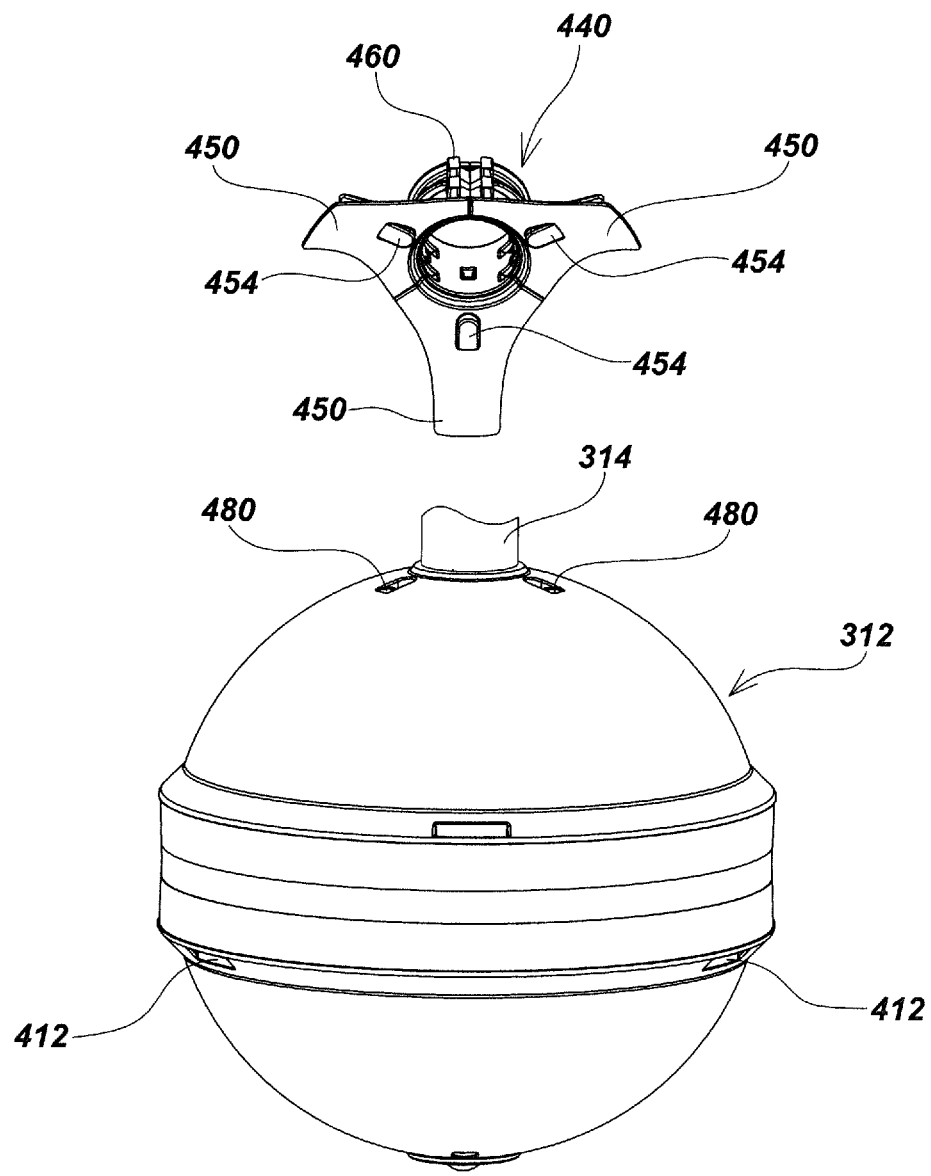
FIG. 4B is a partially exploded key showing a keying element for securing the collar assembly onto a spherical lower antenna node embodiment.

Turning to FIG. 4B, the collar assembly 440 may key to the lower antenna node 312 to align and prevent unwanted rotations of collar assembly 440 about mast 314 (partially cut off within FIG. 4B to show keying elements). For instance, each collar element 450 of the collar assembly 440 may be formed with a bottom nubbin 454 that may key into a corresponding notch 480 formed along the top of the lower antenna node 312. Keying of collar assembly 440 to the lower antenna node 312 may be used to align the collar assembly 440 for installing leg retainer subassembly 330 as illustrated in FIG. 4C, as well as to prevent unwanted rotations of the collar assembly 440 about mast 314.

Figure 4C:
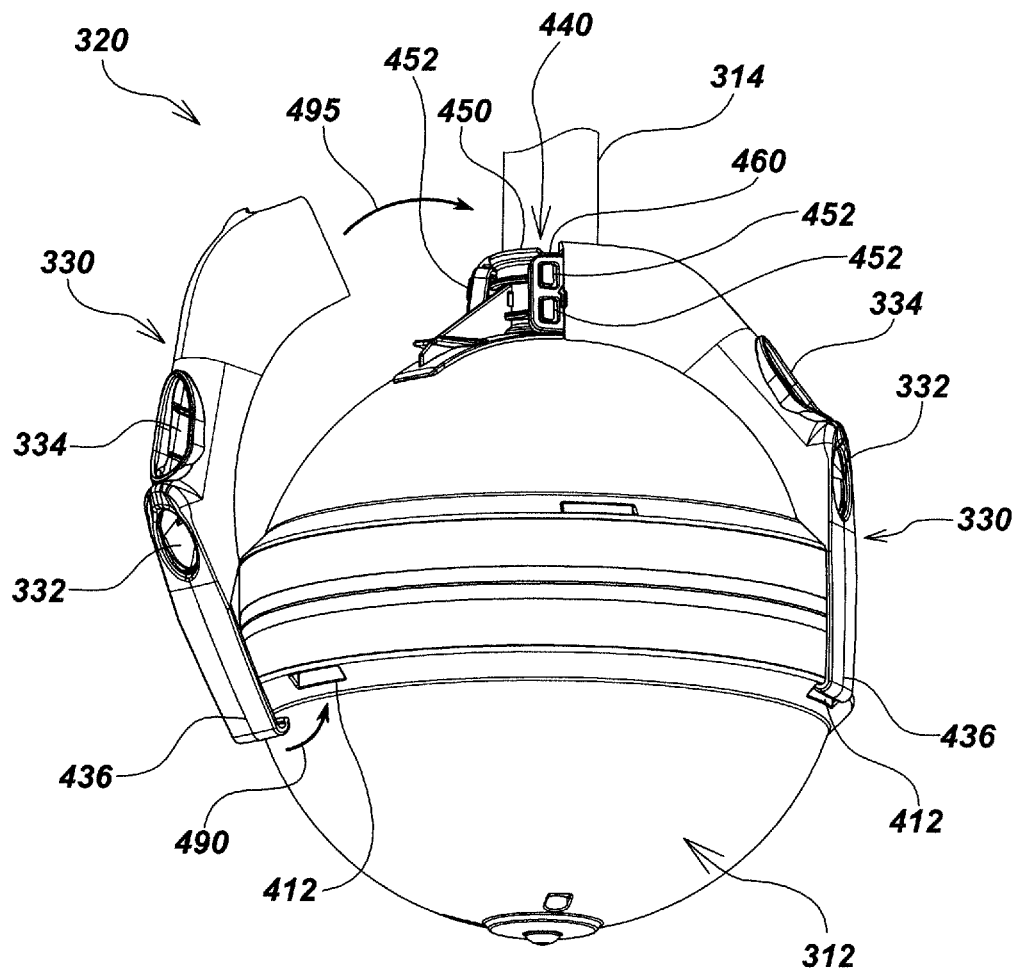
FIG. 4C is an isometric view demonstrating assembly of the lower node support assembly embodiment of FIG. 4A.

As illustrated in FIG. 4C, each leg retainer subassembly 330 may secure to the outside of lower antenna node 312 by first pushing a hook feature 436 formed along the lower portion of each leg retainer subassembly 330 in a direction 490 into a groove 412 formed in the lower antenna node 312. Leg retainer subassemblies 330 may then be rotated in a direction 495, allowing each leg retainer subassembly 330 to snap into place onto collar assembly 440. For instance, a series of retainer divot features 438 (illustrated in FIG. 4A and in detail in FIGS. 5A and 5B) may be formed along a top inner portion of each leg retainer subassembly 330. The retainer divot features 438 (FIG. 4A) may be configured to snuggly snap into place onto the post features 452 of each collar element 450.

Figure 5A:
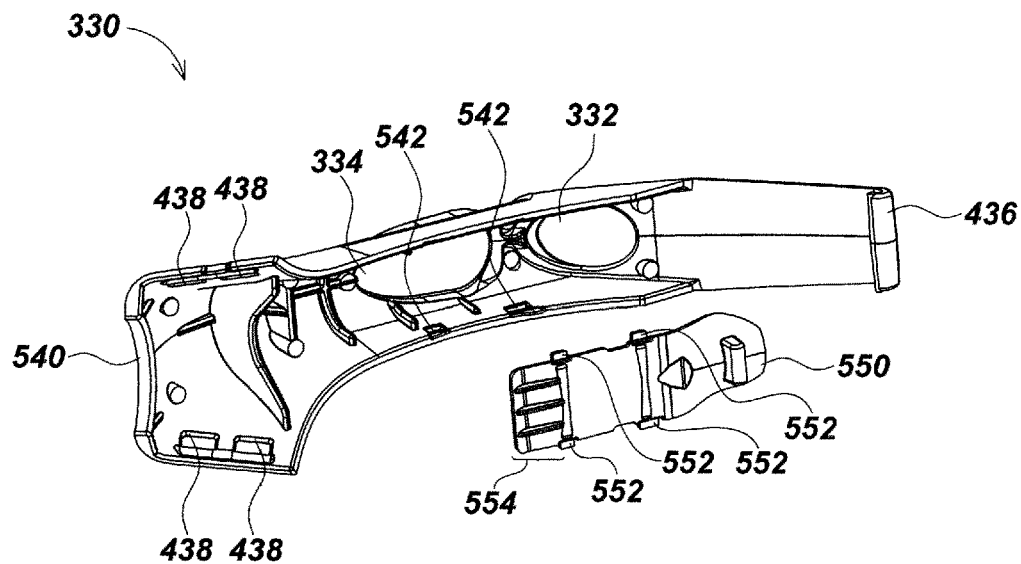
FIG. 5A is a bottom up isometric view of a leg retainer subassembly embodiment.
Figure 5B:
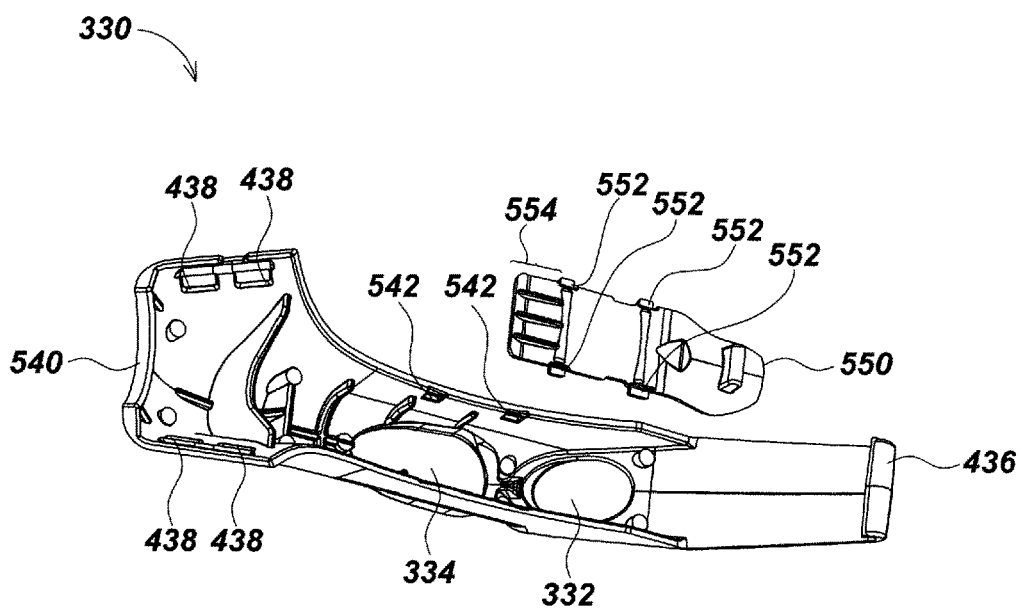
FIG. 5B is a top down isometric view of the leg retainer subassembly embodiment of FIG. 5A.

Further illustrated in FIGS. 5A and 5B, each leg retainer subassembly 330 may have an outer leg retainer element 540 and an inner leg retainer element 550. The outer leg retainer element 540 may have a series of outer leg retainer groove features 542 formed to accommodate and key with a series of inner leg retainer post features 552 formed on the inner leg retainer element 550. In assembly, the inner leg retainer post features 552 may fit within leg retainer groove features 542 and secure the outer leg retainer element 540 and inner leg retainer element 550 together.

When assembled, a cavity may be formed within each leg retainer subassembly 330 behind lower port 332 and between the outer leg retainer element 540 and inner leg retainer element 550 and may be dimensioned to snugly fit a leg 340 (FIGS. 3A-3D) and hold each leg 340 (FIGS. 3A-3C) securely within one leg retainer subassembly 330 when the antenna node support structure device 300 is put in a deployed state as illustrated in FIG. 3A. For instance, insertion of a leg 340 (FIGS. 3A-3D) into the cavity formed behind lower port 332 may cause an upper portion 554 of the inner leg retainer element 550 to bend and flex away from the inserted leg 340 (FIGS. 3A-3D) and further press the upper portion 554 into a section of its associated collar element 450 (FIG. 4A) in assembly.

The deflection of upper portion 554 may cause friction against the leg 340 (FIGS. 3A-3D) and hold it in place until sufficient force, typically a force greater than that imparted by gravity, may cause the leg 340 (FIGS. 3A-3D) to be freed from the cavity formed behind lower port 332 and the friction caused by the upper portion 554 of inner leg retainer element 550. The direction of such a force needed to free each leg 340 (FIGS. 3A-3D) may be described as direction 360 illustrated in FIG. 3B. In alternative embodiments, latches, keying elements, and/or other retaining elements may be used to retain legs 340 (FIGS. 3A-3D) within each leg retainer subassembly 330.

Figure 6:
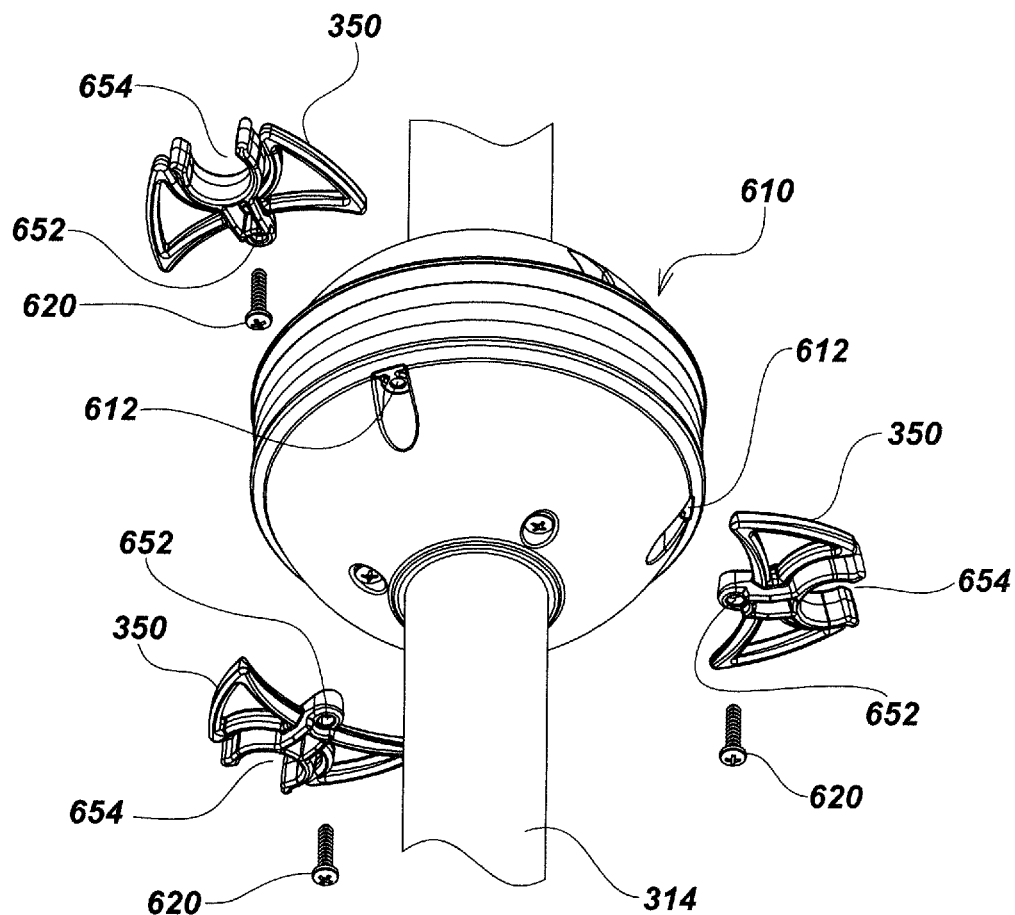
FIG. 6 is an exploded view detailing upper stow retainer embodiments.

Turning to FIG. 6, upper stow retainer elements 350 may secure to an upper antenna node 610 via screws 620 or other fasteners. For example, each screw 620 may fit through a hole feature 652 formed on upper stow retainer elements 350 and may further screw into a hole feature 612 formed within the upper antenna node 610, securing each upper stow retainer element 350 to the upper antenna node 610. In some embodiments, upper stow retainers may secure elsewhere on the utility locator besides an upper antenna node such as the upper stow retainer elements 350 on antenna node 610 illustrated in FIG. 6.

Further illustrated in FIG. 6, each upper stow retainer element 350 may also be formed with a semicircular leg grip feature 654 dimensioned and shaped to grasp and hold a leg 340 (as shown in FIGS. 3A-3C) when the antenna node support structure embodiment 300 is put in a deployed state, such as illustrated in FIG. 3C. Each leg grip feature 654 of upper stow retainer elements 350 may open outward in assembly and approximately align with upper ports 334 of each leg retainer subassembly 330 as is shown in FIG. 3C. In alternate embodiments, upper stow retainer elements, such as the upper stow retainer elements 350, may be coupled to a locator mast and/or other elements of a locator to aid in holding legs in an unobtrusive stowed state.

The present invention is not intended to be limited to the aspects shown herein, but should be accorded the widest scope consistent with the disclosures herein, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments in accordance with various aspects of the present invention. Various modifications to these aspects will be readily apparent to those skilled in the art, and the generic principles defined herein may be applied to other aspects without departing from the spirit or scope of the invention. Thus, the invention as presently claimed is not intended to be limited to the aspects shown herein but is to be accorded the widest scope consistent with the appended claims and their equivalents.

We claim:

1. A self-standing utility locator, comprising:
   a mast having a proximal end and a distal end;
   a locator housing disposed at or near the proximal end of the mast;
   one or more antenna nodes coupled at or near the distal end of the mast;
   a plurality of legs;
   a lower node support assembly coupled to the locator, including one or more ports corresponding to ones of the plurality of legs, wherein the one or more ports are coupled to a lower antenna node of the locator; and
   a plurality of spaced apart leg retainer assemblies for positioning the locator in:
   a deployed state wherein a portion of the legs extends below the lower antenna node and onto a surface in a fixed operating position; and
   in a retracted state for storage or transportation with the legs retracted and/or positioned at least partially above the bottom of the lower antenna node, wherein the ports comprise upper and lower ports in pairs corresponding with each of the legs, wherein either a distal end or a proximal end of the of the legs can be positioned in the upper or lower ports.

2. The locator of claim 1, further comprising a plurality of stow retainer elements to secure the legs in the retracted position.

3. The locator of claim 1, wherein the legs are removably attachable.

4. The locator of claim 1, wherein the legs are removably coupled to the lower antenna node of the locator or the lower node support assembly.

5. The locator of claim 1, wherein the one or more antenna nodes are in a substantially spherical shape.

6. The locator of claim 1, wherein the antenna node comprises an array of 12 antennas.

7. The locator of claim 6, wherein the 12 antennas are coils positioned in a dodecahedral shape.

8. The locator of claim 1, wherein the antenna node comprises an omnidirectional antenna array for sensing magnetic fields in three orthogonal axes.

9. A support structure for attachment to an electronic device including one or more antenna nodes, comprising:
   a plurality of legs;
   a lower node support assembly coupled to the electronic device, including one or more ports corresponding to ones of the plurality of legs, wherein the one or more ports are coupled to a lower antenna node of the electronic device; and
   a plurality of spaced apart leg retainer assemblies for positioning the electronic device in:
   a deployed state wherein a portion of the legs extends below the lower antenna node and onto a surface in a fixed operating position; and
   in a retracted state for storage or transportation with the legs retracted and/or positioned at least partially above the bottom of the lower antenna node, wherein the ports comprise upper and lower ports in pairs corresponding with each of the legs, wherein either a distal end or a proximal end of the of the legs can be positioned in the upper or lower ports.

10. The support structure of claim 9, further comprising a plurality of stow retainer elements to secure the legs in the retracted position.

11. The support structure of claim 9, wherein the legs are removably attachable.

12. The support structure of claim 9, wherein the legs are removably coupled to the lower antenna node of the electronic device or the lower node support assembly.

13. The support structure of claim 9, wherein the one or more antenna nodes are in a substantially spherical shape.

14. The support structure of claim 9, wherein the antenna node comprises an array of 12 antennas.

15. The support structure of claim 14, wherein the 12 antennas are coils positioned in a dodecahedral shape.

16. The support structure of claim 9, wherein the antenna node comprises an omnidirectional antenna array for sensing magnetic fields in three orthogonal axes.

* * * * *